(12) United States Patent
Fujii et al.

(10) Patent No.: US 7,633,924 B2
(45) Date of Patent: Dec. 15, 2009

(54) COMMUNICATIONS SYSTEM, COMMUNICATIONS METHOD, TRANSMITTING APPARATUS, RECEIVING APPARATUS AND CONTROL PROGRAM TO VARIABLY ADJUST A SYMBOL LENGTH

(75) Inventors: Hiromasa Fujii, Kanagawa (JP); Shigeru Tomisato, Okayama (JP); Hirohito Suda, Kanagawa (JP); Tetsushi Abe, Kanagawa (JP); Takefumi Yamada, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 540 days.

(21) Appl. No.: 10/535,859

(22) PCT Filed: Nov. 20, 2003

(86) PCT No.: PCT/JP03/14824

§ 371 (c)(1),
(2), (4) Date: May 20, 2005

(87) PCT Pub. No.: WO2004/047348

PCT Pub. Date: Jun. 3, 2004

(65) Prior Publication Data

US 2006/0031583 A1 Feb. 9, 2006

(30) Foreign Application Priority Data

Nov. 20, 2002 (JP) ............................. 2002-337139

(51) Int. Cl.
*H04J 1/00* (2006.01)

(52) U.S. Cl. ...................................... 370/343; 370/328
(58) Field of Classification Search ................. 370/343, 370/320, 329, 468, 328, 350, 252; 455/631, 455/278.1, 296
See application file for complete search history.

(56) References Cited

U.S. PATENT DOCUMENTS 6,175,550 B1 * 1/2001 van Nee ...................... 370/206
6,208,695 B1 * 3/2001 Klank et al. ................. 375/260

(Continued)

FOREIGN PATENT DOCUMENTS

JP 2000-244441 9/2000

(Continued)

*Primary Examiner*—Kwang B Yao
*Assistant Examiner*—Kenan Cehic
(74) *Attorney, Agent, or Firm*—Oblon, Spivak, McClelland, Maier & Neustadt, L.L.P.

(57) ABSTRACT

An object of the present invention is to provide a communications system etc., which can reduce the influence of interference from other systems which results from a difference in symbol length, in an area where a plurality of systems using different transmission methods are mixed. The present invention relates to a communications system in which a plurality of systems share the same frequency bandwidth so as to transmit information symbols. One of the plurality of systems 1 includes an identifying unit 109 configured to identify the symbol length of an information symbol transmitted in a different system 2; and an adjusting unit 102, 107 configured to adjust the symbol length of an information symbol to be transmitted, in accordance with an identified symbol length.

18 Claims, 24 Drawing Sheets

U.S. PATENT DOCUMENTS

| | | | |
|---|---|---|---|
| 6,545,997 B1 * | 4/2003 | Bohnke et al. | 370/347 |
| 6,556,322 B1 * | 4/2003 | Desurvire | 398/98 |
| 6,580,705 B1 * | 6/2003 | Riazi et al. | 370/347 |
| 7,295,509 B2 * | 11/2007 | Laroia et al. | 370/208 |
| 2001/0028637 A1 * | 10/2001 | Abeta et al. | 370/335 |
| 2002/0057750 A1 * | 5/2002 | Nakao et al. | 375/345 |
| 2002/0105903 A1 * | 8/2002 | Takahashi et al. | 370/208 |
| 2002/0127986 A1 * | 9/2002 | White et al. | 455/194.2 |
| 2003/0090994 A1 * | 5/2003 | Kakura | 370/208 |
| 2004/0081131 A1 * | 4/2004 | Walton et al. | 370/344 |
| 2004/0100897 A1 * | 5/2004 | Shattil | 370/206 |
| 2004/0160987 A1 * | 8/2004 | Sudo et al. | 370/480 |
| 2005/0003828 A1 * | 1/2005 | Sugar et al. | 455/456.1 |
| 2005/0169166 A1 * | 8/2005 | Okada et al. | 370/208 |
| 2005/0232134 A1 * | 10/2005 | van Nee | 370/206 |
| 2006/0002288 A1 * | 1/2006 | Okada et al. | 370/208 |
| 2007/0066362 A1 * | 3/2007 | Ma et al. | 455/562.1 |
| 2007/0157278 A1 * | 7/2007 | Geile et al. | 725/119 |
| 2007/0211786 A1 * | 9/2007 | Shattil | 375/141 |

FOREIGN PATENT DOCUMENTS

| | | |
|---|---|---|
| JP | 2001-069110 | 3/2001 |
| JP | 2001-111519 | 4/2001 |
| JP | 2002-092009 | 3/2002 |
| JP | 2002-141888 | 5/2002 |
| JP | 2002-204217 | 7/2002 |
| JP | 2002-374223 | 12/2002 |

* cited by examiner

EFFECTIVE SYMBOL INTERVAL

EFFECTIVE SYMBOL INTERVAL

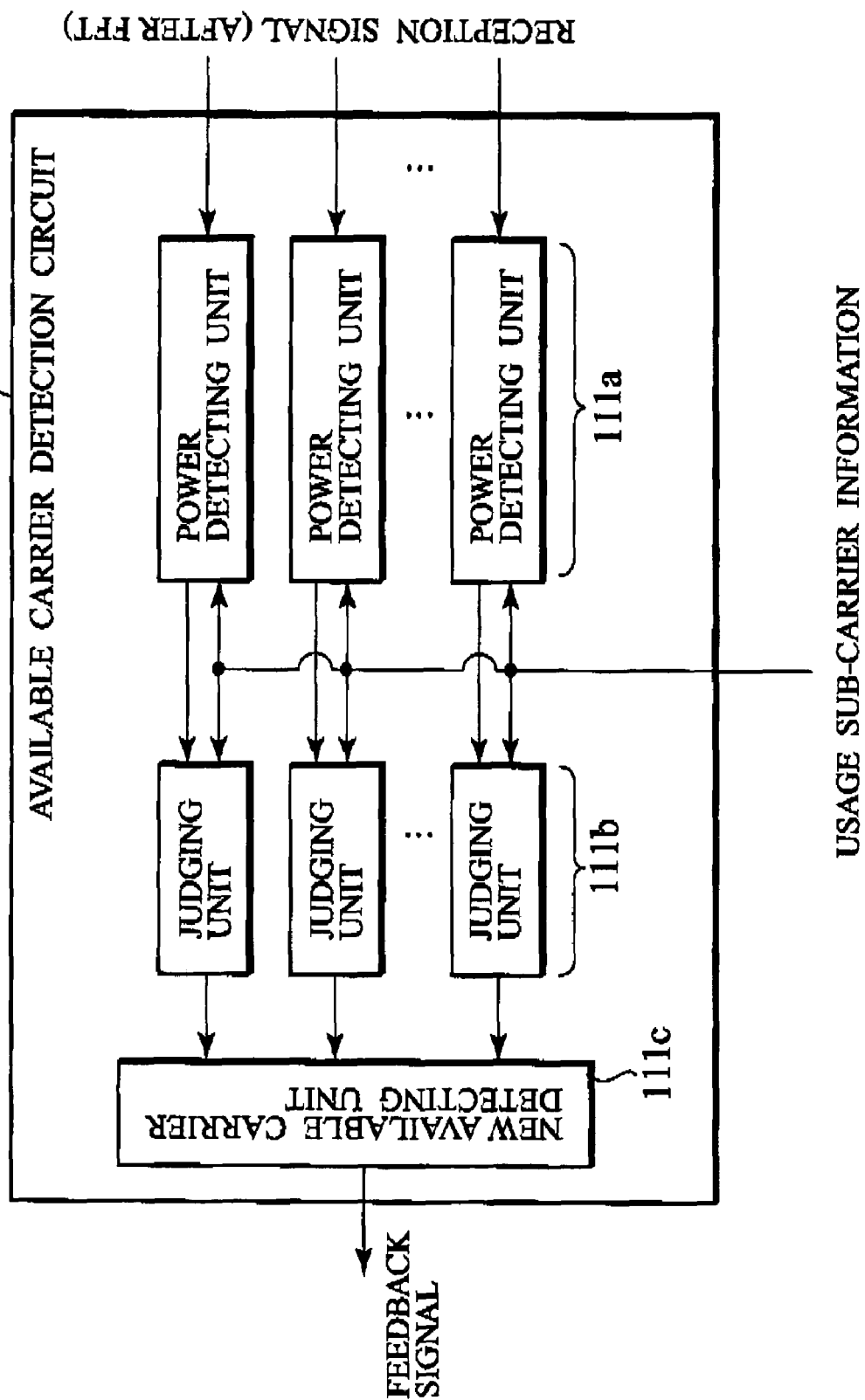

COMMUNICATIONS SYSTEM, COMMUNICATIONS METHOD, TRANSMITTING APPARATUS, RECEIVING APPARATUS AND CONTROL PROGRAM TO VARIABLY ADJUST A SYMBOL LENGTH

TECHNICAL FIELD

The present invention relates to a communications system and a communications method in which the same frequency bandwidth is used by a plurality of transmission methods, a transmitting apparatus, a receiving apparatus and a control program.

BACKGROUND ART

Heretofore, in an OFDM (orthogonal frequency division multiplexing) method which is used for digital terrestrial broadcasting, wireless LANs and the like, the influence of the MPI (multi-path interference) is reduced by inserting a guard interval which is longer than or equal to the multi-path maximum delay time into each OFDM signal (e.g., see Patent Literature 1: JP 2002-204217 A).

FIG. 1A shows a transmitting apparatus 100 which can support the conventional OFDM method; FIG. 1B shows a receiving apparatus 200 which can support the conventional OFDM method.

As shown in FIG. 1A, the transmitting apparatus 100 includes a coder 101, an interleaver 102, a symbol mapper 103, a serial-parallel converting unit (S/P) 104, an inverse fast Fourier transforming unit (IFFT) 105, a parallel-serial converting unit (P/S) 106, an insertion circuit 107 and a transmitting unit 108.

The coder 101 is configured to perform an error correction coding process on input bit streams. The interleaver 102 is configured to perform an interleaving process on the bit streams output from the coder 101. The symbol mapper 103 is configured to map the input bit streams into symbols.

The serial-parallel converting unit 104 is configured to perform a serial-parallel converting process on the symbols output from the symbol mapper 103. The inverse fast Fourier transforming unit 105 is configured to perform an inverse fast Fourier transforming process on the parallel symbols output from the serial-parallel converting unit 104. The parallel-serial converting unit 106 is configured to perform a parallel-serial converting process on the parallel symbols output from the inverse fast Fourier transforming unit 105.

The insertion circuit 107 is configured to generate OFDM signals into which guard intervals (GI) are inserted, from the serial symbols output from the parallel-serial converting unit 106. The transmitting unit 108 is configured to transmit the OFDM signals output from the insertion circuit 107.

As shown in FIG. 1B, the receiving apparatus 200 includes a receiving unit 201, a removal circuit 202, a serial-parallel converting unit (S/P) 203, a fast Fourier transforming unit (FFT) 204, a parallel-serial converting unit (P/S) 205, a symbol demapper 206, a deinterleaver 207 and a decoder 208.

The removal circuit 202 is configured to remove the guard intervals from the OFDM signals received by the receiving unit 201. The serial-parallel converting unit 203 is configured to perform a serial-parallel converting process on serial sample values of the OFDM signals output from the removal circuit 202. The fast Fourier transforming unit 204 is configured to perform a fast Fourier transforming process on the parallel sample values output from the serial-parallel converting unit 203. The parallel-serial converting unit 205 is configured to perform a parallel-serial converting process on the parallel symbols output from the fast Fourier transforming unit 204. The serial symbols output from the parallel-serial converting unit 205 are output as the bit streams input in the transmitting apparatus 100, via the symbol demapper 206, the deinterleaver 207 and the decoder 208.

FIG. 2 shows a structure of an OFDM signal transmitted in the conventional OFDM method.

As shown in FIG. 2, in the OFDM signal, a plurality of sub-carriers are arranged at 1/T intervals. In this case, since modification signals are orthogonal between the respective sub-carriers, the receiving apparatus 200 can separate and demodulate the modification signals of the respective sub-carriers by the fast Fourier transforming process.

For example, in the case where a frequency $f_3$ has been already used by a different system (PDC system etc.), the serial-parallel converting unit 104 performs the serial-parallel converting process so that the output corresponding to the frequency $f_3$ becomes zero.

However, as shown in FIG. 1B, the conventional receiving apparatus 200 demodulates the received OFDM signals using the fast Fourier transforming process. In the case where the symbol length in the own system is different from the symbol length in the different system, which are mixed in the same frequency bandwidth, two symbols of the different system are included within one OFDM symbol interval in the received OFDM signals.

For example, as shown in FIG. 2, OFDM symbols $S_{33}$ and $S_{34}$ of the different system are included in the OFDM symbol interval T of the own system which includes OFDM symbols $S_{04}$, $S_{14}$, $S_{24}$ and $S_{44}$. Here, the OFDM symbol interval T means a length of an OFDM symbol to which a guard interval has been added.

At this time, since the OFDM symbols S33 and S34 are not necessarily constructed by the same modulation signal, as shown in FIG. 2, there is a problem that the orthogonality to the OFDM symbols $S_{04}$, $S_{14}$, $S_{24}$ and $S_{44}$ is lost in the OFDM symbol interval T, and interference from the different system using the frequency $f_3$ occurs at the output of the inverse fast Fourier transforming unit 105. Similarly, the different system suffers from the interference from systems using the OFDM method.

Moreover, in a "VSF-OFCDM (Variable Spreading Factor-Orthogonal Frequency and Code Division Multiplexing) method", which is a so-called fourth generation communications method, symbols are separated onto a plurality of frequency axes and the symbols are spread with a spreading code having a variable spreading factor assigned to each mobile station for transmission. Therefore, a symbol length which is different from a symbol length of a different conventional system (transmission method) is used. As a result, it is expected that the orthogonality of modulation signals cannot be kept in areas where other systems are mixed, interference occurs, and the same frequency bandwidth cannot be shared.

DISCLOSURE OF THE INVENTION

The present invention has been made in view of the above, and has an object of providing a communications system and a communications method which can reduce the influence of interference from other systems which results from a difference in symbol length, in an area where a plurality of systems using different transmission methods are mixed, a transmitting apparatus, a receiving apparatus and a control program.

A first aspect of the present invention is summarized as a communications system in which a plurality of systems share a frequency bandwidth to transmit information symbols; wherein one of the plurality of systems includes: an identifying unit configured to identify a symbol length of an information symbol transmitted in a different system; and an adjusting unit configured to adjust a symbol length of an information symbol to be transmitted, in accordance with an identified symbol length.

A second aspect of the present invention is summarized as a communications method in which a plurality of systems share a frequency bandwidth to transmit information symbols, including steps of; identifying, in one of the plurality of systems, a symbol length of an information symbol transmitted in a different system; and adjusting, in the one of the plurality of systems, a symbol length of an information symbol to be transmitted, in accordance with an identified symbol length.

A third aspect of the present invention is summarized as a transmitting apparatus in a communications system in which a plurality of systems share a frequency bandwidth to transmit information symbols, including: an identifying unit configured to identify a symbol length of an information symbol transmitted in a different system; and an adjusting unit configured to adjust a symbol length of an information symbol to be transmitted, in accordance with an identified symbol length.

In the third aspect of the present invention, the identifying unit can be configured to identify a transmission timing of the information symbol in the different system; and the adjusting unit can be configured to adjust a transmission timing of the information symbol to be transmitted, in accordance with an identified transmission timing.

In the third aspect of the present invention, the transmitting apparatus can be configured to transmit the information symbols using an OFDM (orthogonal frequency division multiplexing) method; the transmitting apparatus can include a spreading unit configured to spread the information symbol to be transmitted, with a spreading code assigned to a receiving apparatus; and the adjusting unit can be configured to adjust the symbol length of a spread information symbol, in accordance with the identified symbol length.

In the third aspect of the present invention, the adjusting unit is configured to adjust the symbol length of the information symbol to be transmitted, by adding a symbol length adjustment signal to the information symbol so that an effective symbol interval of the information symbol is set in the middle of a symbol interval of the information symbol.

In the third, aspect of the present invention, the transmitting apparatus can be configured to transmit the information symbols with using an OFDM method; and a part of the symbol length adjustment signal or the whole of the symbol length adjustment signal can constitute a guard interval.

In the third aspect of the present invention, the adjusting unit can be configured to adjust the symbol length of the information symbol to be transmitted so that the symbol length of the information symbol becomes a nonnegative integral multiple or a nonnegative integral submultiple of a detected symbol length.

In the third aspect of the present invention, the transmitting apparatus can be configured to transmit the information symbols using an OFDM method; the identifying unit can be configured to identify a frequency bandwidth used in the different system; and the adjusting unit can be configured to adjust so as not to use an identified frequency bandwidth and a frequency bandwidth adjacent to the identified frequency bandwidth for transmission of the information symbol.

In the third aspect of the present invention, the transmitting apparatus can include a pilot multiplexing unit configured to determine allocation of a pilot symbol to be multiplexed, by using a predetermined algorithm which is shared with a receiving apparatus, in accordance with a sub-carrier which is associated with a frequency bandwidth to be used for the transmission of the information symbol.

In the third aspect of the present invention, the pilot multiplexing unit can be configured to multiplex the pilot symbol to a sub-carrier which is associated with a frequency bandwidth adjacent to a frequency bandwidth not to be used for the transmission of the information symbol.

In the third aspect of the present invention, the transmitting apparatus can be configured to transmit the information symbols using an OFDM method; and the identifying unit can be configured to judge that a frequency bandwidth associated with a sub-carrier in a reception signal from the different system is used in the different system, when a power level of a signal component of the sub-carrier is larger than a predetermined threshold.

A fourth aspect of the present invention is summarized as a receiving apparatus in a communications system in which a plurality of systems share a frequency bandwidth to transmit information symbols, including: an identifying unit configured to identify a symbol, length of an information symbol transmitted in a different system; and an adjusting unit configured to remove a symbol length adjustment signal from a received information symbol, in accordance with an identified symbol length.

In the fourth aspect of the present invention, the receiving apparatus can be configured to receive the information symbols transmitted using an OFDM method; and the identifying unit can be configured to identify a frequency bandwidth used in one of the plurality of systems to which the receiving apparatus belongs, based on information on a frequency bandwidth associated with a sub-carrier in which a power level of a received signal component is smaller than or equal to a predetermined threshold and information on a frequency bandwidth used in the different system.

In the fourth aspect of the present invention, the receiving apparatus can be configured to receive the information symbols transmitted using an OFDM method; and the receiving apparatus can include: a power detecting unit configured to detect a frequency bandwidth associated with a sub-carrier in which a power level of a received signal component is larger than or equal to a predetermined threshold; and a collision detecting unit configured to detect a collision of signals in the same frequency bandwidth, based on a frequency bandwidth used in the different system which is identified by the identifying unit and the frequency bandwidth detected by the power detecting unit.

In the fourth aspect of the present invention, the receiving apparatus can be configured to receive the information symbols transmitted using an OFDM method; and the receiving apparatus can include: a power detecting unit configured to detect a frequency bandwidth associated with a sub-carrier in which a power level of a received signal component is smaller than or equal to a predetermined threshold; and a non-usage frequency bandwidth detecting unit configured to detect a frequency bandwidth which is not used in one of the plurality of systems to which the receiving apparatus belongs and the different system, based on a frequency bandwidth used in the different system which is identified by the identifying unit and the frequency bandwidth detected by the power detecting unit.

In the fourth aspect of the present invention, the receiving apparatus can be configured to receive the information symbols transmitted using an OFDM method; and the identifying unit can be configured to identify a frequency bandwidth used in one of the plurality of systems to which the receiving apparatus belongs, based on a reception power of a sub-carrier in an interval preceding a head of an OFDM frame.

A fifth aspect of the present invention is summarized as a control program which controls a transmitting apparatus belonging to one of a plurality of systems, in a communications system in which the plurality of systems share a frequency bandwidth to transmit information symbols; wherein the control program makes a computer function as: an identifying unit configured to identify a symbol length of an information symbol transmitted in a different system; and a notifying unit configured to notify the transmitting apparatus of a symbol length adjustment signal to be added to an information symbol to be transmitted, so as to adjust a symbol length of the information symbol, in accordance with an identified symbol length.

BRIEF DESCRIPTION OF DRAWINGS

FIG. 19 is a functional block diagram of an available carrier detection circuit used in an eleventh embodiment of the present invention.

BEST MODE FOR CARRYING OUT THE INVENTION

Figure 1A:
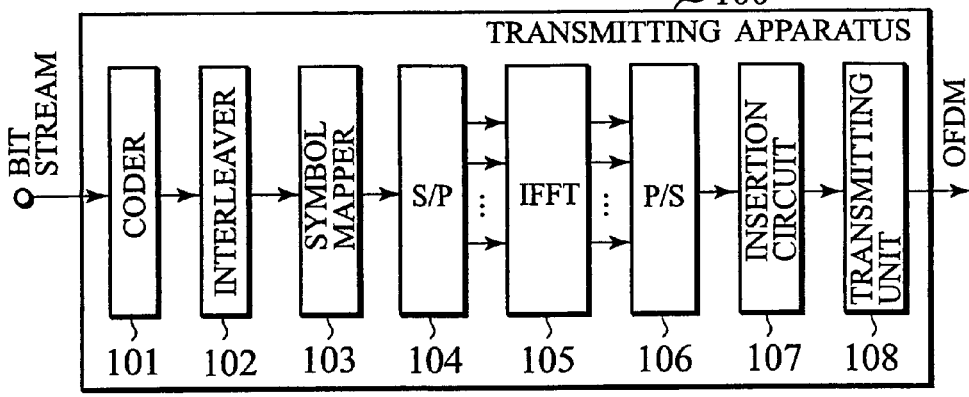
FIG. 1A is a functional block diagram of a transmitting apparatus which can support the conventional OFDM method.
Figure 1B:
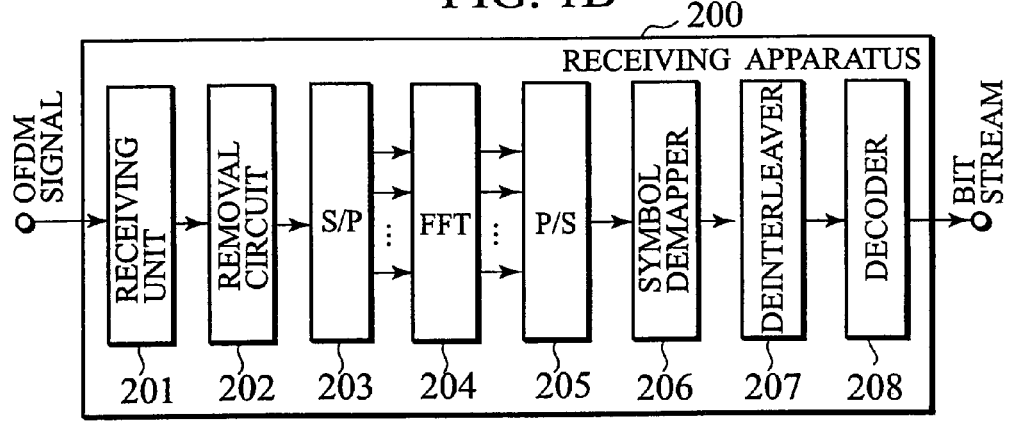
FIG. 1B is a functional block diagram of a receiving apparatus which can, support the conventional OFDM method.
Figure 2:
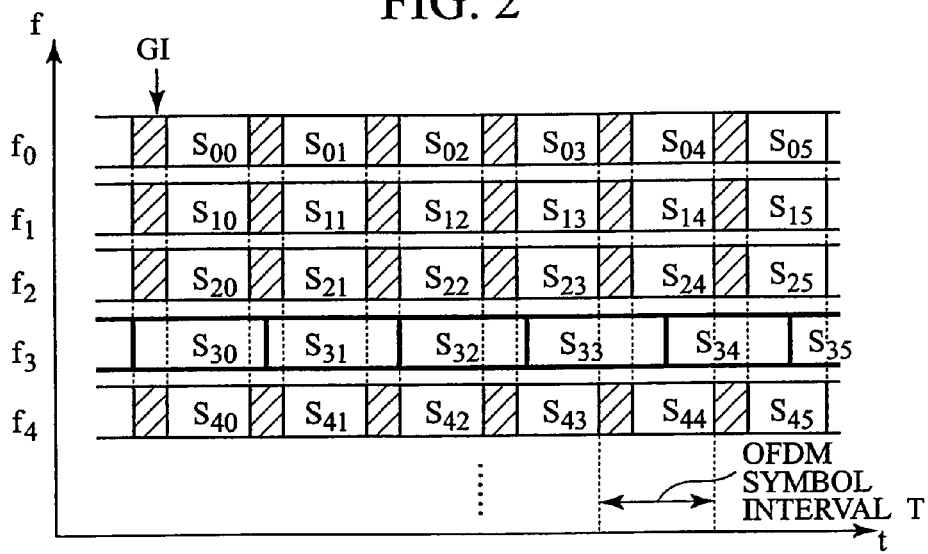
FIG. 2 is a diagram for explaining a structure of an OFDM signal in the conventional OFDM method.
Figure 3:
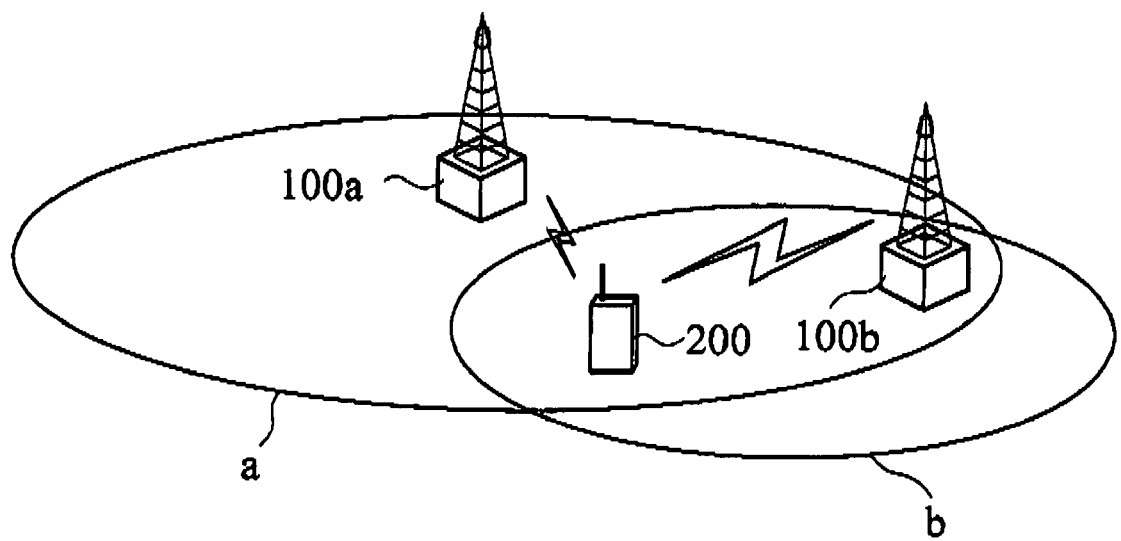
FIG. 3 is a diagram showing an entire configuration of a communications system according to each embodiment of the present invention.

FIG. 3 is a schematic configuration diagram showing the whole configuration of a communications system according to each embodiment of the present invention to be described later.

As shown in FIG. 3, the communications system includes base stations 100a, 100b which perform radio communications with different transmission methods, and a mobile station 200 which can perform radio communications with the base stations 100.

In each embodiment, it is assumed that a cell "a" covered by the base station 100a is overlapped with a cell "b" covered by the base station 100b. And, it is assumed that a system 1 to which the base station 100a belongs and a system 2 to which the base station 100b belongs perform radio communications, sharing the same frequency bandwidth and using different transmission method, in the area where the two cells are overlapped. Moreover, in each embodiment, it is assumed that the base station 100a is an example of the transmitting apparatus according to the present invention, and the mobile station 200 is an example of the receiving apparatus according to the present invention. Furthermore, in each embodiment, it is assumed that the system 1 is an "own system", and the system 2 is a "different system".

First Embodiment

Figure 4:
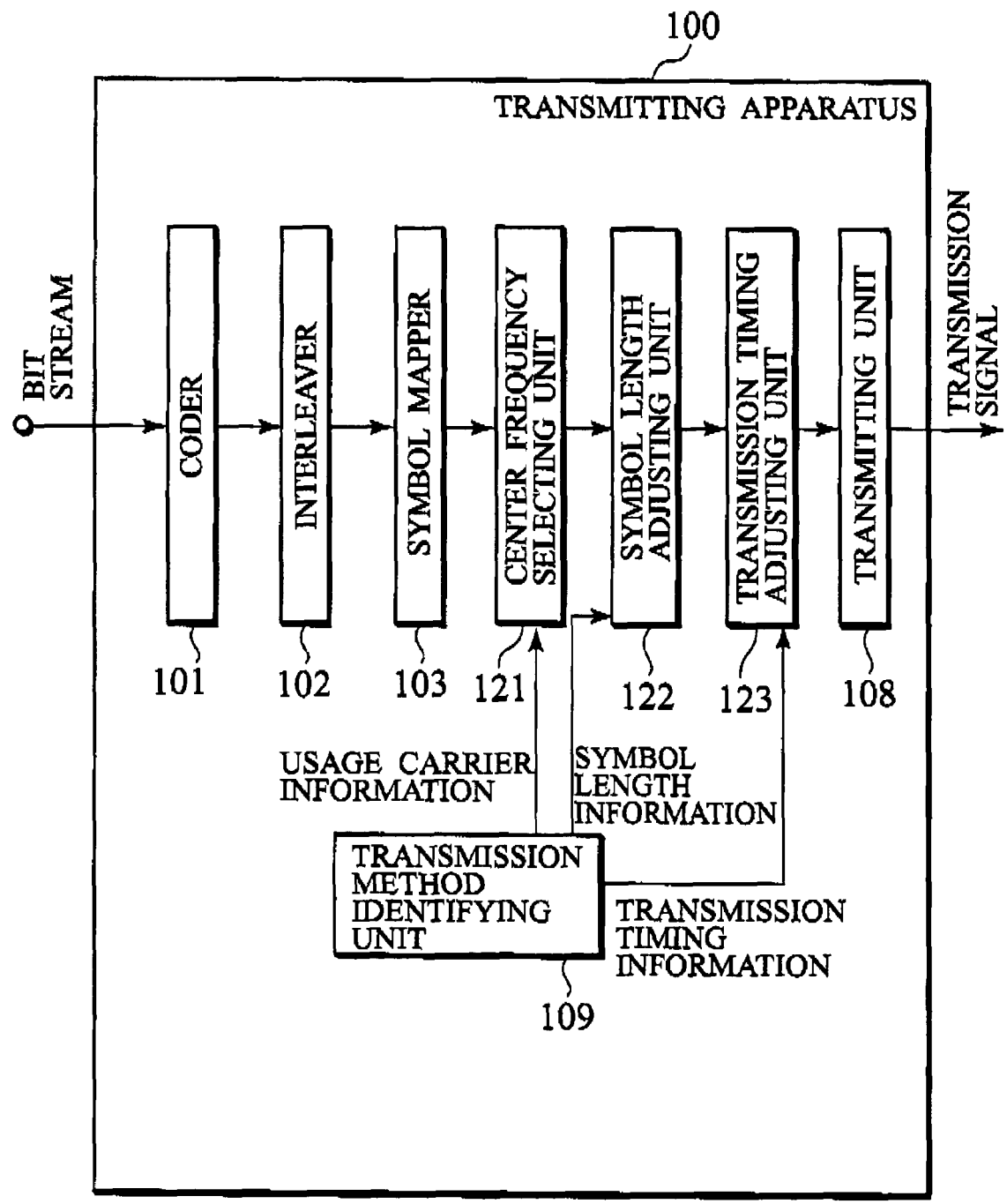
FIG. 4 is a functional block diagram of a transmitting apparatus according to a first embodiment of the present invention.
Figure 5:
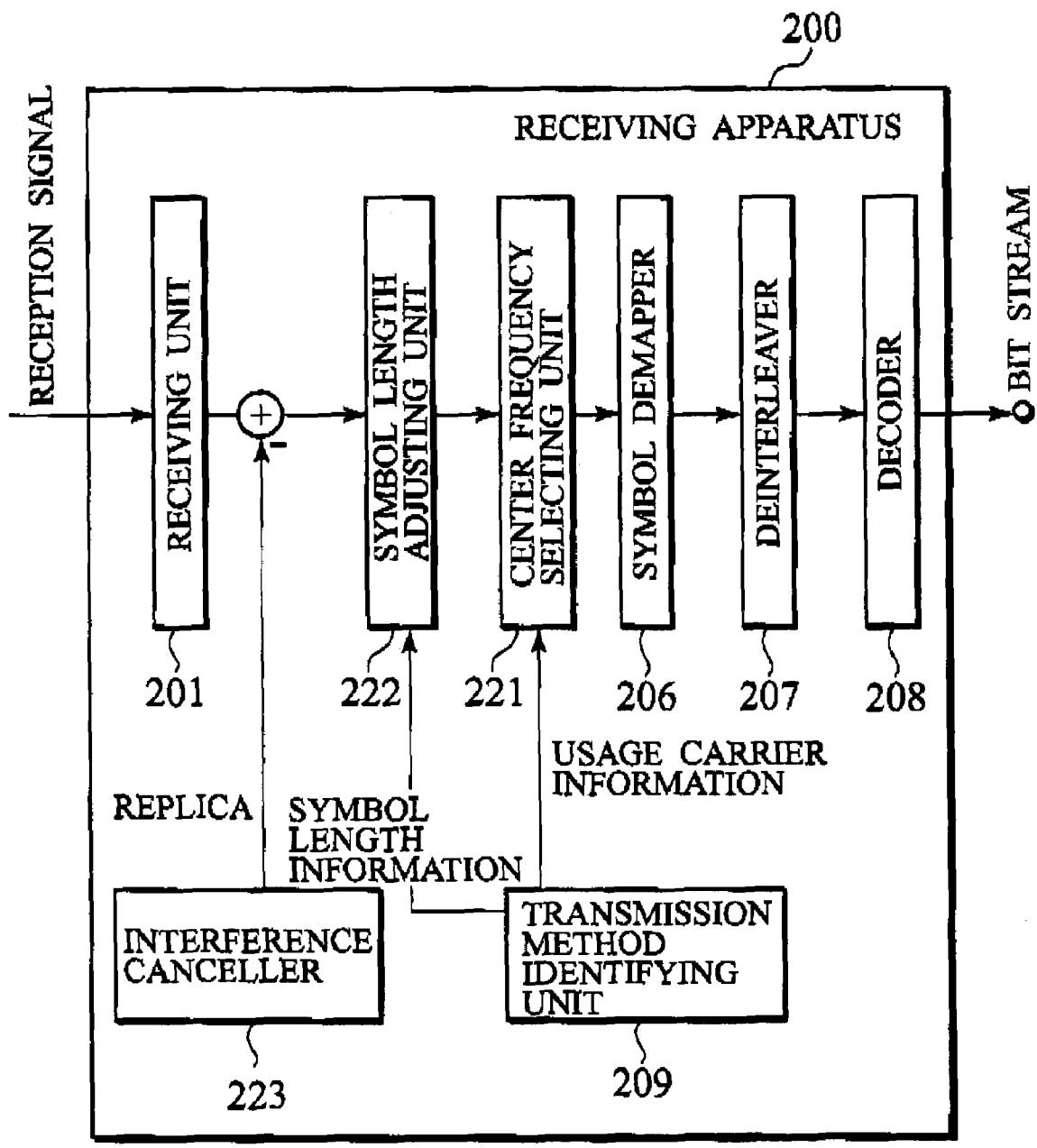
FIG. 5 is a functional block diagram of a receiving apparatus according to the first embodiment of the present invention.

Referring to FIG. 4 and FIG. 5, a communications system according to the first embodiment of the present invention will be described in detail. FIG. 4 shows a transmitting apparatus 100 according to this embodiment; FIG. 5 shows a receiving apparatus 200 according to this embodiment. Hereinafter, the difference between the transmitting apparatus 100 and the receiving apparatus 200 according to the first embodiment and those according to the prior art will be described mainly.

As shown in FIG. 4, the transmitting apparatus 100 includes a coder 101, an interleaver 102, a symbol mapper 103, a center frequency selecting unit 121, a symbol length adjusting unit 122, a transmission timing adjusting unit 123, a transmitting unit 108 and a transmission method identifying unit 109.

The center frequency selecting unit 121 is configured to receive "usage carrier information" showing frequency bandwidths of carriers used in the system 2 (the different system) from the transmission method identifying unit 109, to select a frequency bandwidth which is not used in the system 2 based on the usage carrier information, and to perform a primary modulation using a predetermined modulation method on the information symbols from the coder 103.

Here, the center frequency selecting unit 121 can select a specific frequency bandwidth by using a conventional channel assignment algorithm, when a plurality of frequency bandwidths are not used in the system 2.

The symbol length adjusting unit 122 is configured to receive "symbol length information" showing the symbol length of an information symbol transmitted in the system 2 from the transmission method identifying unit 109, and to adjust the symbol length of an information symbol to be transmitted, based on the symbol length information.

The symbol length adjusting unit 122 can adjust the symbol length of the information symbol, by adding a symbol length adjustment signal to the information symbol.

The transmission timing adjusting unit 123 is configured to receive "transmission timing information (e.g., clock information of the system 2)" showing a transmission timing of an information symbol in the system 2, and to adjust a transmission timing of an information symbol to be transmitted, based on the transmission timing information.

The transmission method identifying unit 109 is configured to identify a plurality of transmission methods mixed in the cell "a" which is covered by the transmitting apparatus (base station) 100a, and to communicate the result to the center frequency selecting unit 121, the symbol length adjusting unit 122, the transmission timing adjusting unit 123 and so on. More specifically, the transmission method identifying unit 109 identifies the usage carrier information, the symbol length information, the transmission timing information and so on, as a transmission method.

The plurality of transmission methods can be identified by control information (reception signal) received from the system 2, or may set in advance.

The transmitting apparatus 100 can belong to two ore more systems, and can be configured to transmit transmission signals with two or more transmission methods.

As shown in FIG. 5, the receiving apparatus 200 includes a receiving unit 201, a symbol length adjusting unit 222, a center frequency selecting unit 221, a symbol demapper 206, a deinterleaver 207, a decoder 208, a transmission method identifying unit 209 and an interference canceller 223.

The interference canceller 223 is configured to generate a replica of a signal received from the system 2, and to subtract the replica from a signal received by the receiving unit 201. As a result, even when the system 1 is affected by large interference, such as when the symbol length of an information symbol transmitted in the system 1 is n (n is a nonnegative integer except one) times the symbol length of an information symbol transmitted in the system 2, more advanced interference canceling function can be achieved.

The symbol length adjusting unit 222 is configured to remove a symbol length adjustment signal from a received information symbol, based on symbol length information from the transmission method identifying unit 209.

The center frequency selecting unit 221 is configured to select a frequency bandwidth of a carrier used for transmission of information symbols in the system 1, based on usage carrier information from the transmission method identifying unit 209.

The transmission, method identifying unit 209 is configured to identify a plurality of transmission methods mixed in the cell "a" which is covered by the transmitting apparatus 100 (the base station 100a), and to communicate the result to the center frequency selecting unit 221, the symbol length adjusting unit 222 and so on. More specifically, the transmission method identifying unit 209 identifies usage carrier information, symbol length information and so on, as a transmission method. Furthermore, the transmission method identifying unit 209 may be configured to identify transmission timing information and communicate it to the receiving unit 201.

The transmission method identifying unit 209 may be configured to identify a plurality of transmission methods by control information from the transmitting apparatus 100, or may be configured to identify a plurality of transmission methods from a reception signal from the system 2.

Second Embodiment

The second embodiment will be described with an example in which a base station 100a transmits signals by an OFDM method which is a multi-carrier transmission method using a plurality of sub-carriers, and a base station 100b transmits signals by a conventional transmission method such as a CDMA method.

Figure 6:
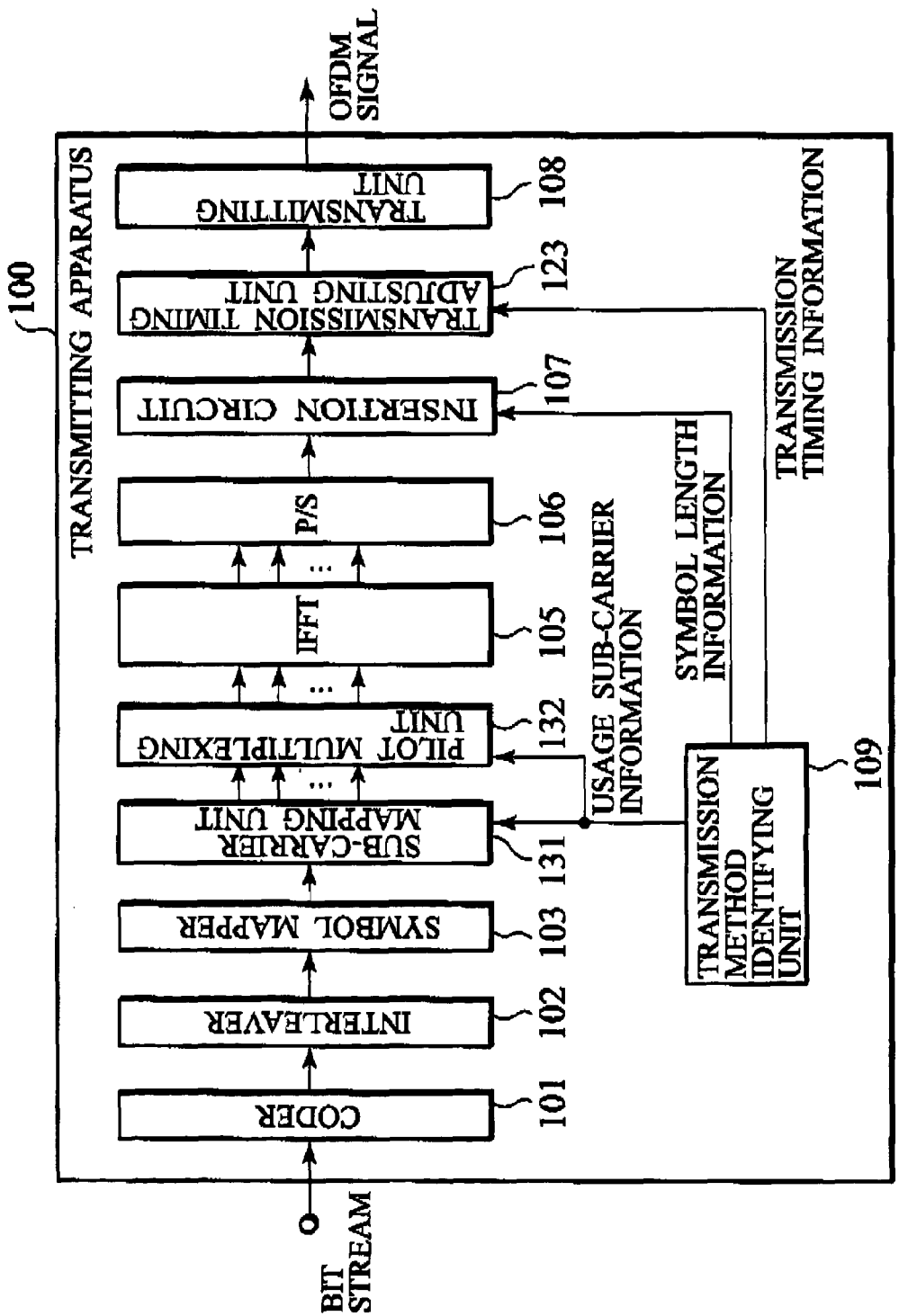
FIG. 6 is a functional block diagram of a transmitting apparatus according to a second embodiment of the present invention.
Figure 8:
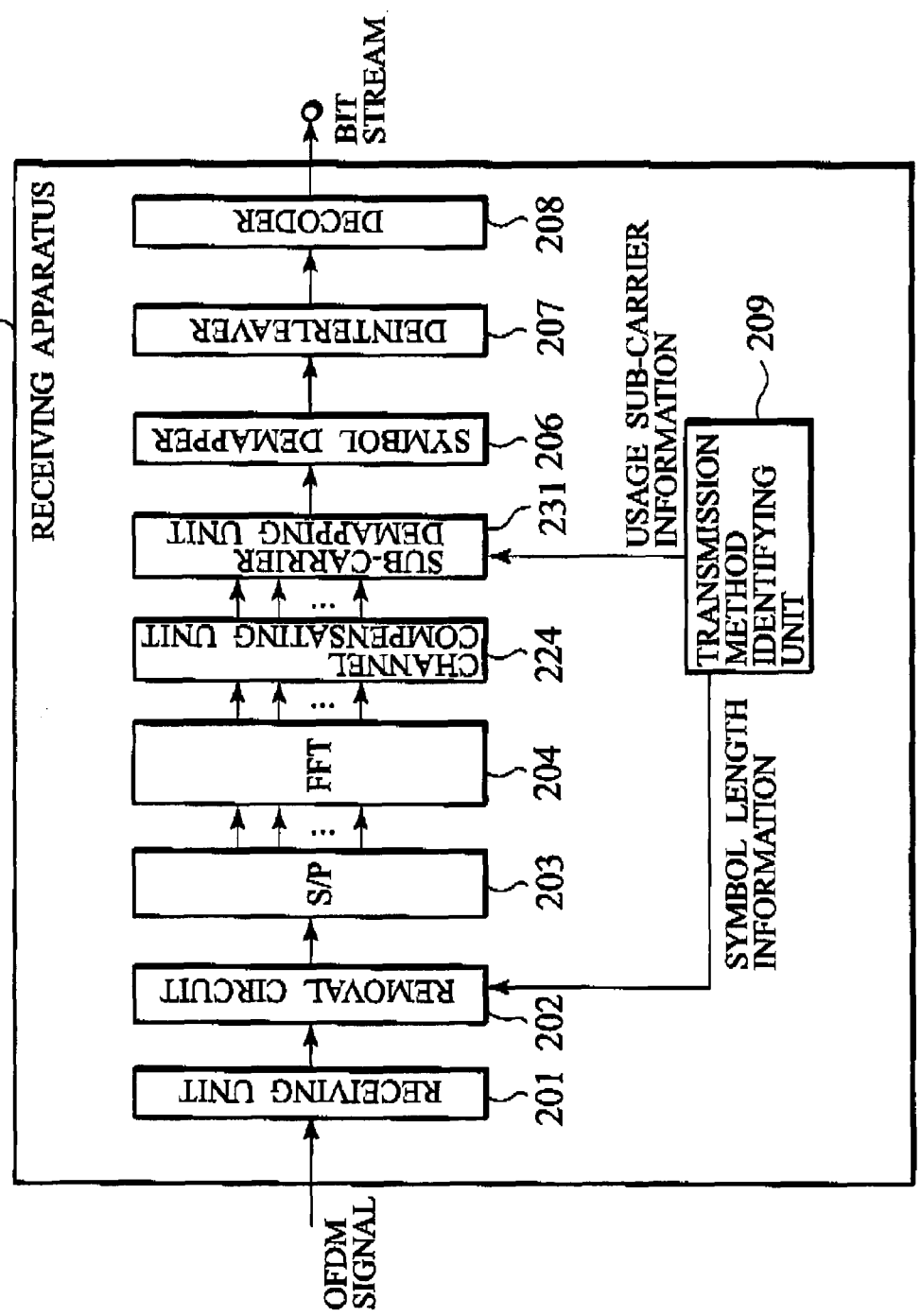
FIG. 8 is a functional block diagram of a receiving apparatus according to the second embodiment of the present invention.

FIG. 6 shows a transmitting apparatus 100 according to this embodiment; FIG. 8 shows a receiving apparatus 200 according to this embodiment. Hereinafter, the difference between the transmitting apparatus 100 and the receiving apparatus 200 according to the first embodiment and those according to the prior art will be described mainly.

As shown in FIG. 6, the transmitting apparatus 100 according to this embodiment includes a coder 101, an interleaver 102, a symbol mapper 103, a sub-carrier mapping unit 131, a pilot multiplexing unit 132, an inverse fast Fourier transforming unit (IFFT) 105, a parallel-serial converting unit (P/S) 106, an insertion circuit 107, a transmission timing adjusting unit 123, a transmitting unit 108 and a transmission method identifying unit 109.

The sub-carrier mapping unit 131 is configured to select a sub-carrier of a frequency bandwidth other than a frequency bandwidth of a sub-carrier used in the system 2 based on the usage carrier information from the transmission method identifying unit 109, and to map an information symbol of a frequency bandwidth input from the coder 103 into the selected sub-carrier.

The pilot multiplexing unit 132 is configured to multiplex a pilot symbol into the sub-carrier selected by the sub-carrier mapping unit 131, based on the usage carrier information from the transmission method identifying unit 109. For example, the pilot multiplexing unit 132 multiplexes a pilot symbol only into a sub-carrier to be used in the system 1 among allocated positions of the pilot symbol originally scheduled, i.e., only into a sub-carrier associated with a frequency bandwidth used for transmission of information symbols.

The insertion circuit 107 is configured to add a guard interval and a symbol length adjustment signal to an OFDM signal output from the parallel-serial converting unit 106, based on the symbol length information from the transmission method identifying unit 109.

In other words, the insertion circuit 107 is a circuit which generates a symbol length adjustment signal for making a difference in symbol length (or symbol rate) between the system 1 (the own system) and the system 2 (the different system) zero, based on symbol length information from the transmission method identifying unit 109, and adds the generated symbol length adjustment signal to an OFDM signal.

Figure 7:
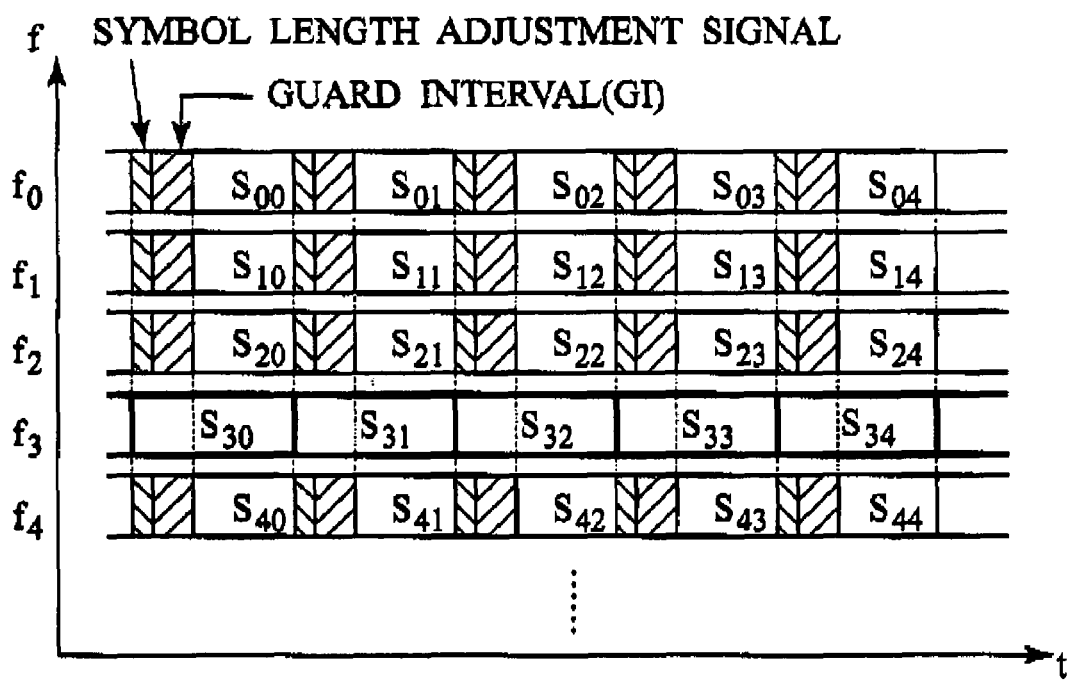
FIG. 7 is a diagram for explaining a structure of an OFDM signal in the second embodiment of the present invention.

More specifically, as shown in FIG. 7, the insertion circuit 107 inserts a symbol length adjustment signal between two information symbols divided by each sub-carrier. Here, in the example of FIG. 7, the insertion circuit 107 adds the symbol length adjustment signals to the information symbols S including guard intervals which have already been inserted.

The insertion-circuit 107 can generate a symbol length adjustment signal by copying a part of sample values output from the inverse fast Fourier transforming unit 105 corresponding to 1 OFDM symbol. Furthermore, a symbol length adjustment signal can be used for symbol synchronization, when a synchronization word is inserted into the symbol length adjustment signal.

The insertion circuit 107 can generate a part of a symbol length adjustment signal by copying a part of sample values output from the inverse fast Fourier transforming unit 105, and generate the rest of the symbol length adjustment signal by a simple signal constituted only by "0", for example.

When receiving symbol length information showing a guard interval length from the transmission method identifying unit 109, the insertion circuit 107 adds a guard interval having the guard interval length to an OFDM signal. In this case, the guard interval also serves as a symbol length adjustment signal.

The transmission method identifying unit 109 is configured to communicate a value calculated by subtracting an OFDM symbol length within an effective symbol interval from a symbol length used in the system 2, to the insertion circuit 107, as the guard interval.

For example, the transmission method identifying unit 109 outputs a difference in symbol length (or symbol rate) between the own system and the different system which are mixed in the same frequency bandwidth. Here, when knowing the difference in symbol length (or symbol rate) between the own system and the different system which are mixed in the same frequency bandwidth, the transmission method identifying unit 109 can store a fixed value of the difference, and output the fixed value as a calculation result without calculating the difference.

For example, the symbol rate of the PDC method is 21 kHz, and the frequency interval of the PDC method is 25 kHz (interleave allocation). Therefore, in order to configure the OFDM method using the same base station as the PDC method, it is necessary to set a sub-carrier interval 1/T of the OFDM method at 25 kHz. In this case, the length of 1 symbol interval (symbol length) of the PDC method becomes 47.6 „s, and the length of 1 symbol interval (symbol length) of the OFDM method becomes 40 „s.

In the second embodiment, in order to match the lengths of 1 symbol interval (symbol lengths) in such two systems, the insertion circuit 107 sets the sum of a guard interval and a symbol length adjustment signal to be inserted into an OFDM signal at 7.6„s, and makes the lengths of 1 symbol interval in the two systems equal.

For example, when setting the guard interval to be inserted at 5 „s which is one-eighth of the length of 1 OFDM symbol (symbol length), the insertion circuit 107 sets the length of the symbol length adjustment signal to be inserted at 2.6 „s.

As shown in FIG. 8, the receiving apparatus 200 includes a receiving unit 201, a removal circuit 202, a serial-parallel converting unit (S/P) 203, a fast Fourier transforming unit (FFT) 204, a channel compensating unit 224, a sub-carrier demapping unit 231, a symbol demapper 206, a deinterleaver 207, a decoder 208 and a transmission method identifying unit 209.

The removal circuit 202 is a circuit which removes a symbol length adjustment signal and a guard interval added by the transmitting apparatus 100, based on symbol length information from the transmission method identifying unit 209. More specifically, the removal circuit 202 removes a symbol length adjustment signal and a guard interval from an OFDM signal received at the receiving unit 201, and outputs the result to the serial-parallel converting unit (S/P) 203.

Even with the symbol length and the transmission timing completely matched, if the system 1 performs reception in a conventional manner, a transfer function of a band pass filter (BPF) does not have an ideal rectangle form, the system 1 suffers from interference from an adjacent sub-carrier of the OFDM method. However, the receiving apparatus of the different system can use a reception method such as a fast Fourier transforming process after using a band pass filter which passes n adjacent sub-carriers, to solve this problem.

According to the second embodiment, for example, even when the system 1 (the own system) transmitting information symbols with the OFDM method and the system 2 (the different system) transmitting information symbols with the transmission method other than the OFDM method share the same frequency bandwidth, it is possible to match the symbol lengths (the symbol rates) to bemused between the system 1 and the system 2, by adding, to information bits to be transmitted, a symbol length adjustment signal based on the difference between the symbol lengths (the symbol rates) to be used by the system 1 and the system 2.

As a result, for example, it is possible to keep the orthogonality of signals in 1 OFDM symbol interval in the OFDM method, and to reduce interference in an output of the fast Fourier transforming unit 204.

Third Embodiment

In the above-described second embodiment, the example in which the transmitting apparatus 100 (the base station 100a) transmits information symbols with the OFDM method has been explained. However, the present invention can also be applied to the case where a system 1 which transmits information symbols with a VSF-OFCDM (Variable Spreading Factor—Orthogonal Frequency and Code. Division Multiplexing) method and a system 2 which transmits information symbols with a different transmission method are mixed.

The VSF-OFCDM method is a transmission method which combines a VSF (Variable Spreading Factor) with an OFCDM (Orthogonal Frequency and Code Division Multiplexing). The VSF can secure a certain communication quality in accordance with various environments such as cities, suburbs, the indoors and so on, by spreading an information symbol into the time domain and the frequency domain using a spreading code assigned to each mobile station 200, and performing variable control on the spreading factor. The OFCDM reduces multi-path influence by transmitting signals of a frequency bandwidth of 100 MHz with a plurality of sub-carriers in parallel, and making a symbol length per sub-carrier longer than a multi-path delay time.

Hereinafter, regarding configurations of the transmitting apparatus 100 and the receiving apparatus 200, the difference between the transmitting apparatus 100 and the receiving apparatus 200 according to the first embodiment and those according to the prior art will be described mainly.

Figure 9:
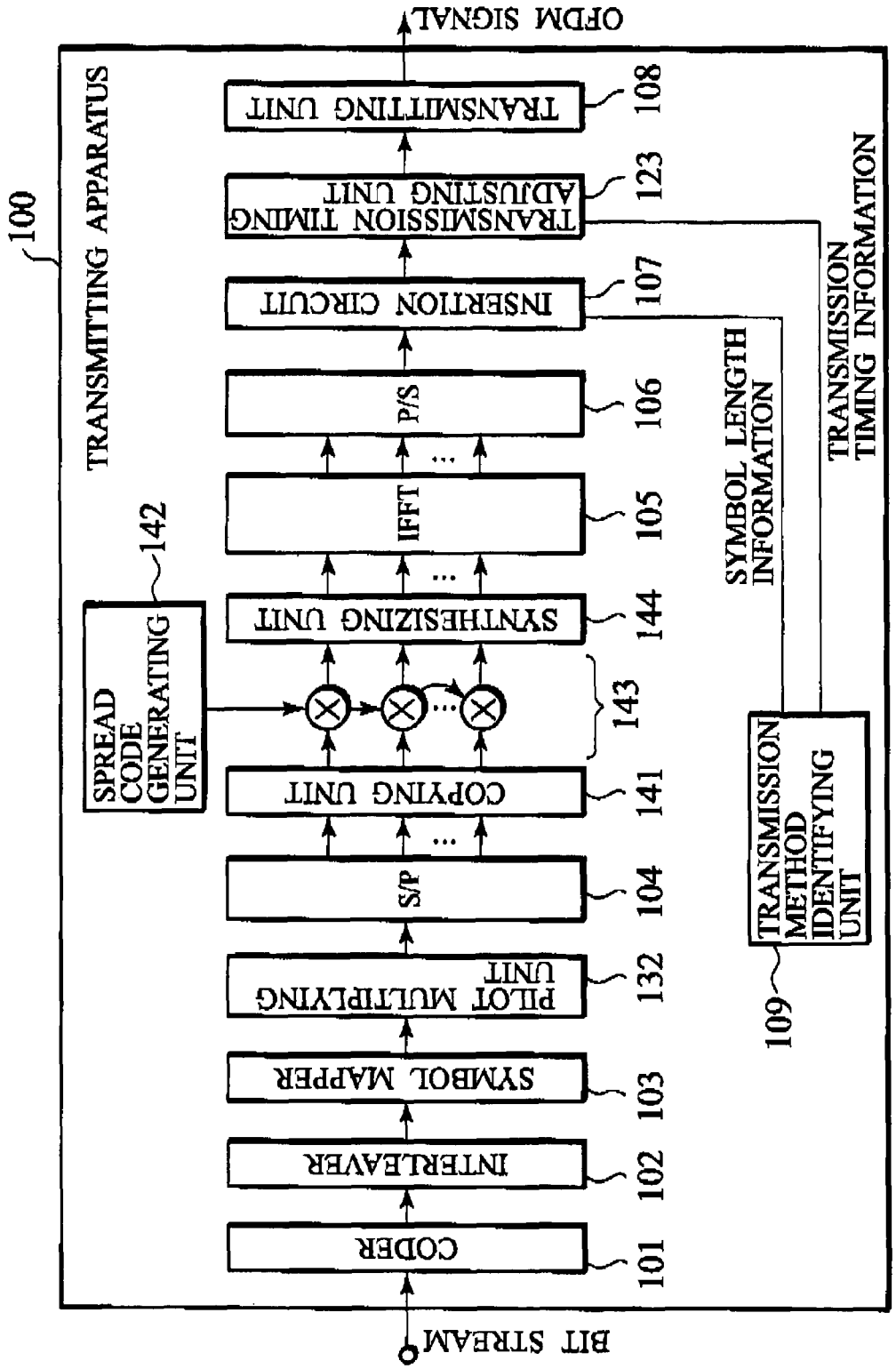
FIG. 9 is a functional block diagram of a transmitting apparatus according to a third embodiment of the present invention.

As shown in FIG. 9, the transmitting apparatus 100 according to the third embodiment includes a coder 101, an interleaver 102, a symbol mapper 103, a pilot multiplexing unit 132, a serial-parallel converting unit (S/P) 104, a copying unit 141, a plurality of multiplying units 143, a synthesizing unit 144, an inverse fast Fourier transforming unit (IFFT) 105, a parallel-serial converting unit (P/S) 106, an insertion circuit 107, a transmission timing adjusting unit 123, a transmitting unit 108 and a transmission method identifying unit 109.

The copying unit 141 is a circuit which copies each information symbol of a plurality of information symbol sequences on which the serial-parallel converting process has been performed in the serial-parallel converting unit 104. The number of copied information symbols is equal to the chip length of a spreading code. The copied information symbols are arranged on the frequency axis, and are output to the multiplying units 143 as a pair of information symbol sequences.

The spreading code generating unit 142 is a circuit which generates spreading codes having a predetermined spreading factor assigned to each mobile station. The number of generated spreading codes is equal to the number of sub-carriers. The multiplying unit 143 is a circuit which multiplies each information symbol copied in the copying unit 141 by the spreading code generated by the spreading code generating unit 142. The synthesizing unit 144 is a circuit which synthesizes the information symbols multiplied by the plurality of multiplying units 143.

Figure 10:
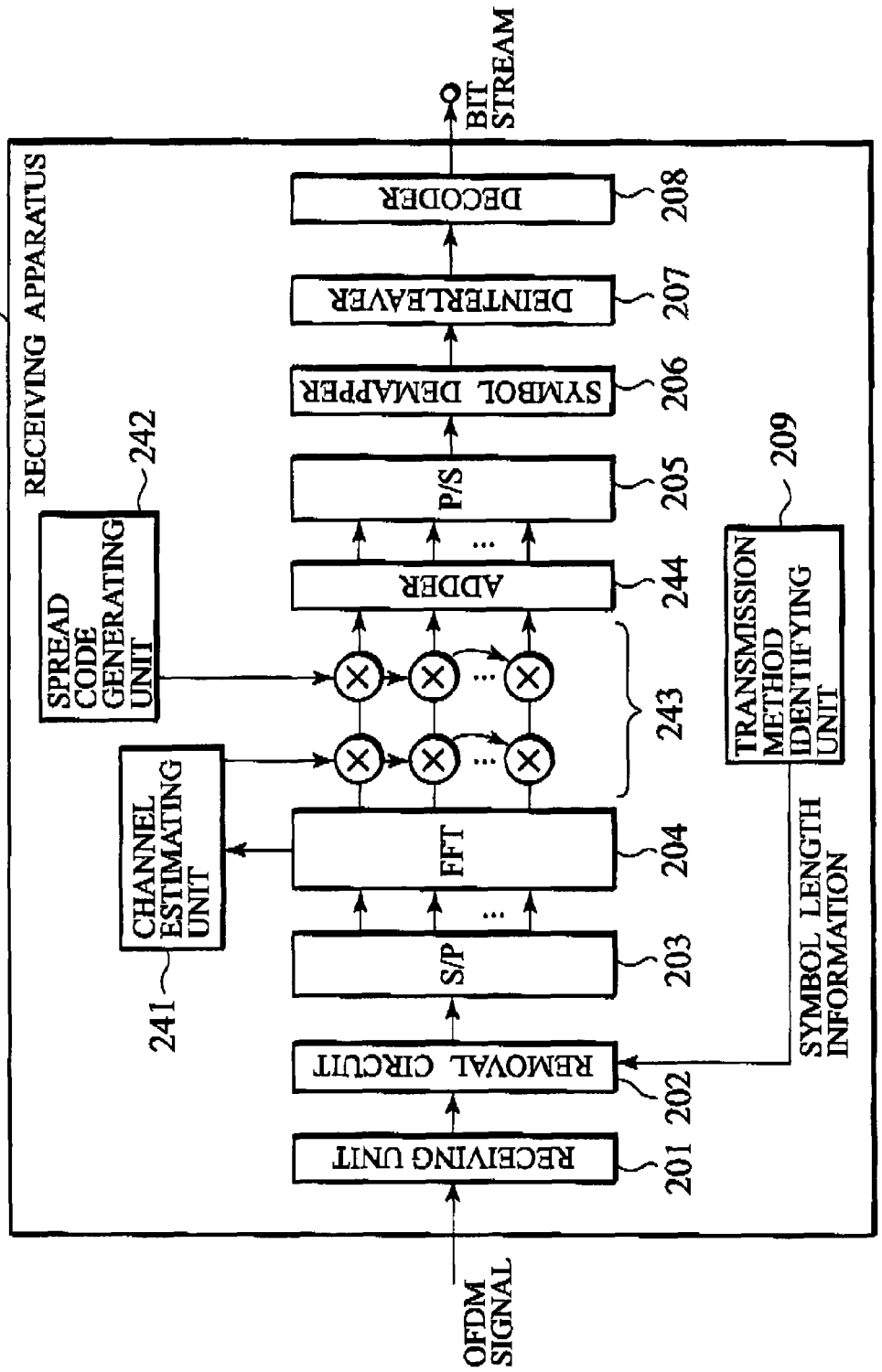
FIG. 10 is a functional block diagram of a receiving apparatus according to the third embodiment of the present invention.

As shown in FIG. 10, the receiving apparatus 200 according to the third embodiment includes a receiving unit 201, a removal circuit 202, a serial-parallel converting unit (S/P) 203, a fast Fourier transforming unit (FFT) 204, a channel estimating unit 241, a spreading code generating unit 242, an adder 244, a parallel-serial converting unit (P/S) 205, a symbol demapper 206, a deinterleaver 207, a decoder 208 and a transmission method identifying unit 209.

The channel estimating unit 241 is a circuit which extracts a pilot symbol from an output from the fast Fourier transforming unit 204, and estimates a value showing change of a channel of each sub-carrier based on the pilot symbol.

The multiplying unit 243 is a circuit which compensates the change of each sub-carrier for the output from the fast Fourier transforming unit 204 based on the value estimated by the channel estimating unit 241, and multiply the compensation result by the spreading code generated the spreading code generating unit 242. The adder 244 is a circuit which adds the information symbols output from the plurality of multiplying units 243.

According to the third embodiment, since the VSF-OFCDM method which spreads into the time domain and the frequency domain by a spreading code having a spreading factor assigned to each mobile station is adopted and the information symbols are transmitted, matched to a symbol length (or a symbol rate) used in a system of a different transmission method, it is possible to adapt to communication environments such as cities, suburbs, the indoors and so on, and to share the same frequency bandwidth with a system of a different transmission method.

Fourth Embodiment

Figure 11:
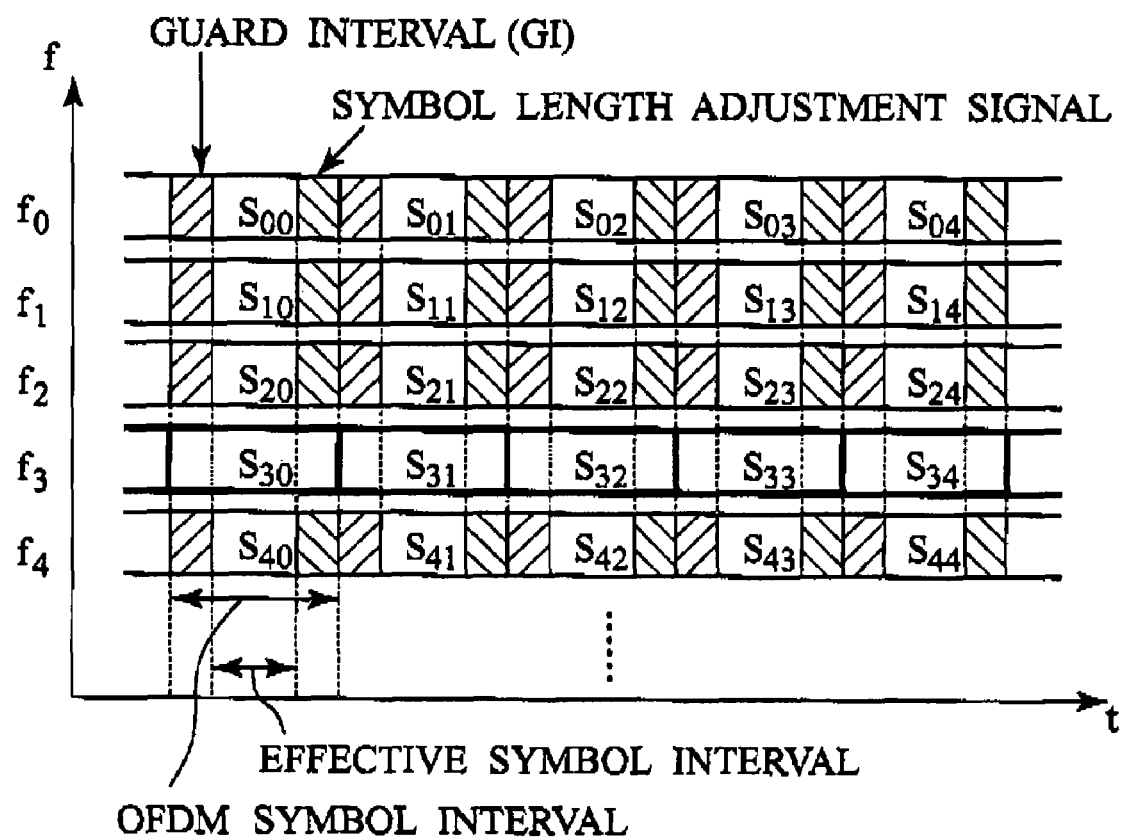
FIG. 11 is a diagram for explaining a structure of an OFDM signal in a fourth embodiment of the present invention.

Referring to FIG. 11, the fourth embodiment of the present invention will be described. Here, the entire configuration of a communications system according to this embodiment, the configuration of a base station according to this embodiment and the configuration of a mobile station according to this embodiment are same as those of the above-described second embodiment.

In the fourth embodiment, the insertion circuit 107 is configured to add a symbol length adjustment signal to an information symbol to be transmitted, so that an effective symbol interval (an interval acquired by removing a guard interval from a symbol interval) of the information symbol is positioned in the middle of a symbol interval of the information symbol.

An OFDM signal transmitted from a base station 100a and a signal of a different transmission method transmitted from a base station 100b are configured to be orthogonal in 1 OFDM symbol interval of the OFDM signal. Both the signals use the same frequency bandwidth.

More specifically, as shown in FIG. 11, the insertion circuit 107 inserts a guard interval before an information symbol S and inserts a symbol length adjustment signal after the information symbol S, so that an effective symbol interval of the information symbols including the symbol length adjustment signal and the guard interval is positioned in the middle of an OFDM symbol interval of the information symbol S.

According to the fourth embodiment, even when a frequency bandwidth of a transmitted OFDM signal is limited and each information symbol does not have a rectangular form, and a signal of a different transmission method is mixed in the same frequency bandwidths as the OFDM signal, it is possible to prevent an inter-symbol interference by the symbol length adjustment signal, and to keep proper orthogonality.

Fifth Embodiment

Referring to FIG. 12A to FIG. 13B, the fifth embodiment of the present invention will be described. The fifth embodiment is characterized by adding a part of a symbol length adjustment signal or the whole of the symbol length adjustment signal to an OFDM signal as a guard interval.

Figure 12A:
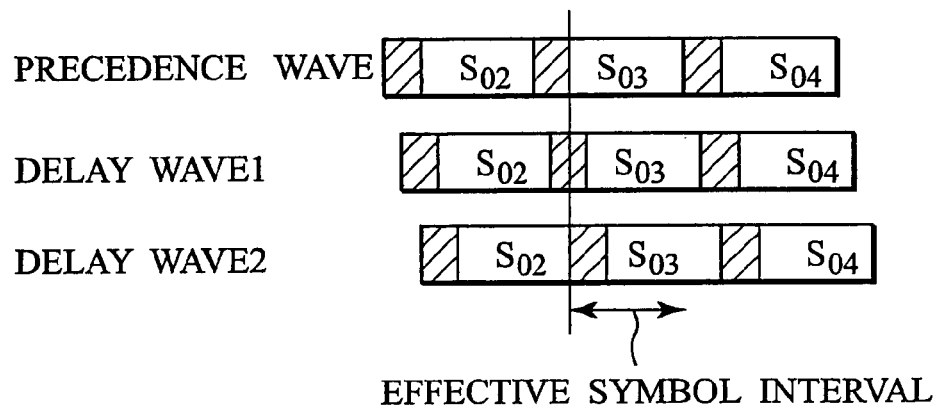
FIGS. 12A and 12B are diagrams for explaining inconvenience in the conventional OFDM method.

The OFDM signal copes with a delay of each path in a multi-path propagation route, using the guard interval. In other words, as shown in FIG. 12A, it is possible to demodulate an information symbol without the inter-symbol interference, by determining a 1 OFDM symbol interval which becomes effective at the time of demodulation (an effective symbol interval).

Figure 12B:
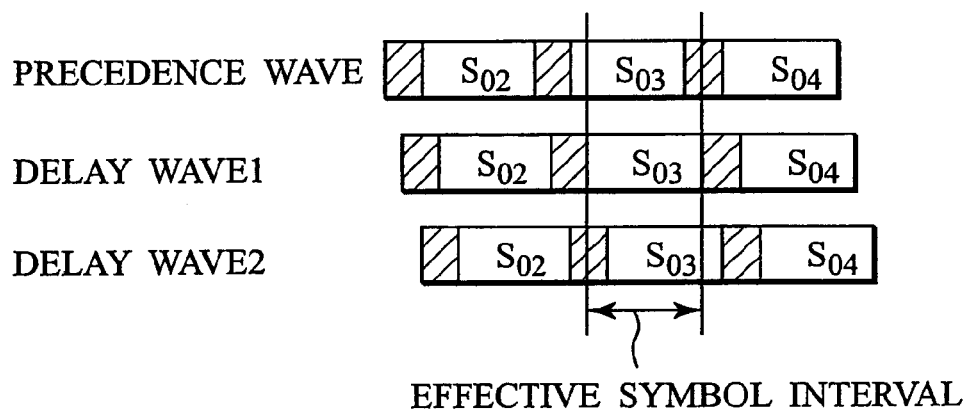

However, as shown in FIG. 12B, when a delay time which exceeds the guard interval in a delay wave 2 occurs, there is an inconvenience that the OFDM symbol (the information symbol) $S_{O3}$ departs from the effective symbol interval, i.e. symbol synchronization is lost, and the inter-symbol interference occurs.

Figure 13A:
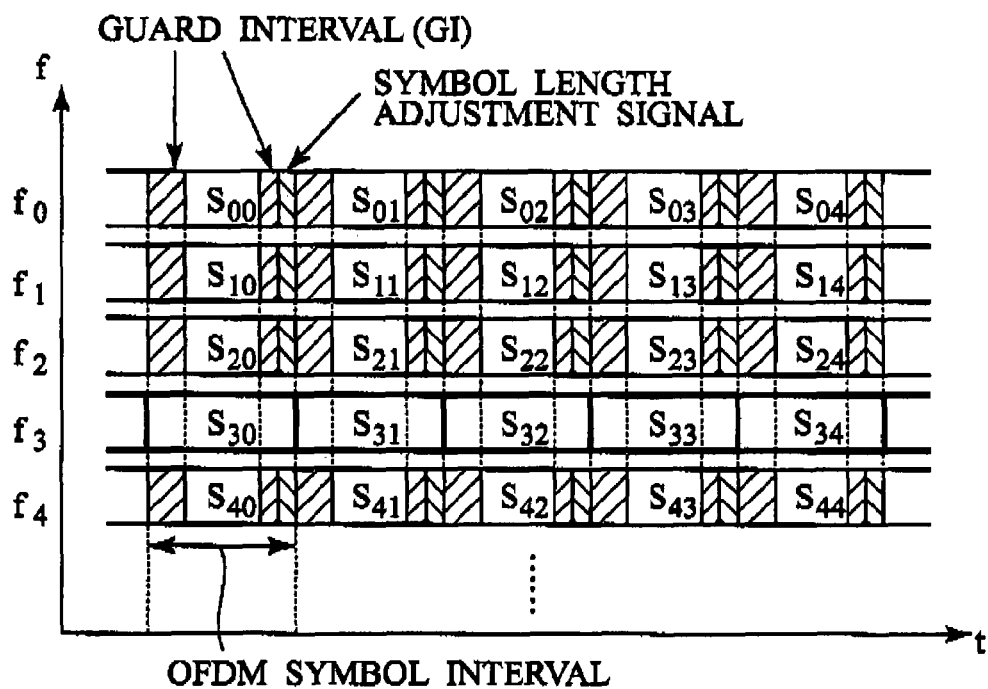
FIGS. 13A and 13B are diagrams for explaining a structure of an OFDM signal in a fifth embodiment of the present invention.

In the fifth embodiment, as shown in FIG. 13A, a guard interval and a symbol length adjustment signal are arranged before and after the OFDM symbol S, and a part of the symbol length adjustment signal is used as a guard interval, so as to resolve the above-described inconvenience.

Here, FIG. 13A shows an example in which the symbol length adjustment signal is arranged after the effective symbol interval of the OFDM symbol, and a part of the symbol length adjustment signal is used as the guard interval.

Figure 13B:
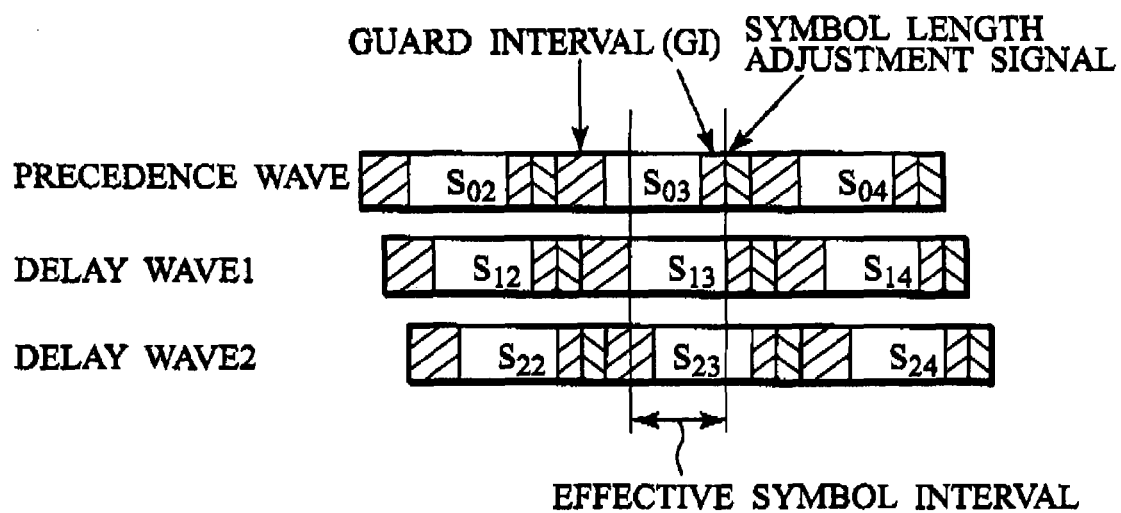

According to the fifth embodiment, as shown in FIG. 13B, even when the symbol synchronization is lost, the symbol length adjustment signal plays the role of the guard interval, so that the OFDM symbol S is within the effective symbol interval and the system 1 does not suffer from the interference from the front and the back OFDM symbols.

Sixth Embodiment

Figure 14A:
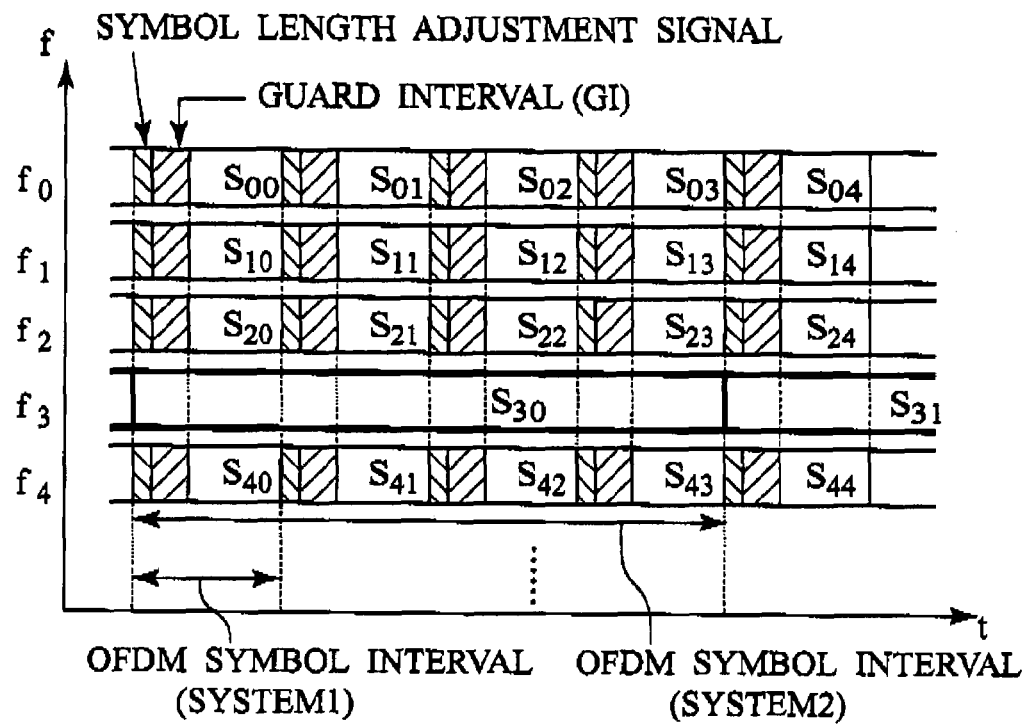
FIGS. 14A and 14B are diagrams for explaining a structure of an OFDM signal in a sixth embodiment of the present invention.
Figure 14B:
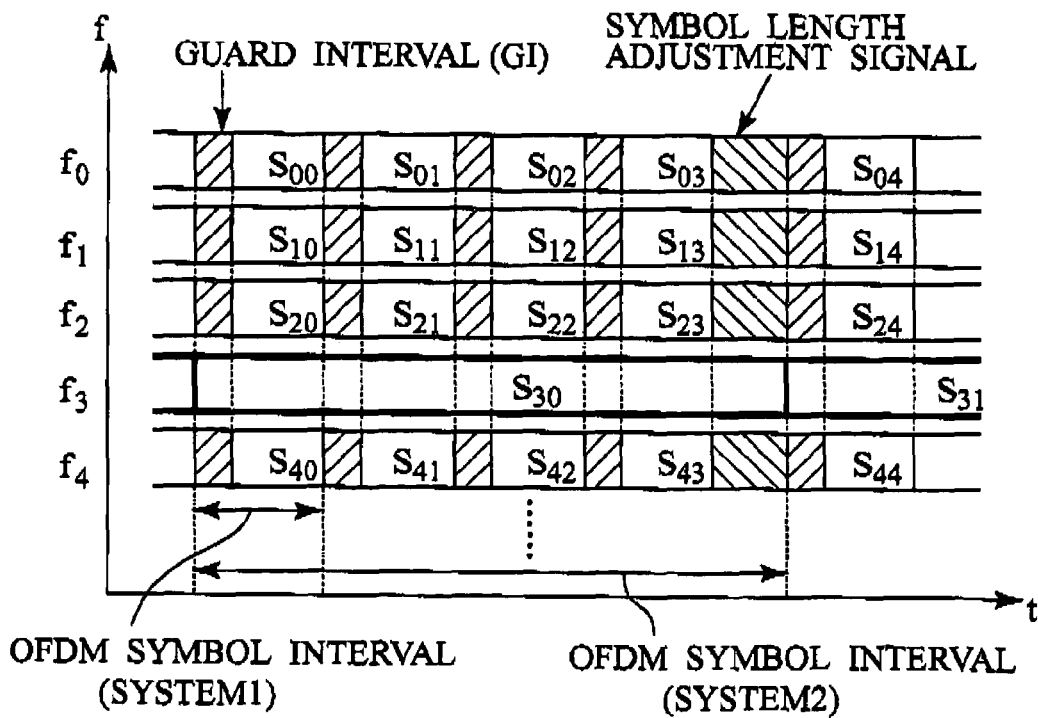

Referring to FIG. 14A and FIG. 14B, the sixth embodiment of the present invention will be described.

The sixth embodiment is characterized in that an insertion circuit 107 adds a symbol length adjustment signal to an information symbol to be transmitted, in order to adjust the symbol length of the information symbol so that it becomes a nonnegative integral multiple or a nonnegative integral sub-multiple of a symbol length used in a different system (system 2).

For example, as shown in FIG. 14A and FIG. 14B, the symbol length adjustment signals are added to n (n is an integer equal to or larger than two), information symbols $S_{00}$, $S_{01}$, $S_{02}$, $S_{03}$ in the system 1, so that the length of the n information symbols $S_{00}$, $S_{01}$, $S_{02}$, $S_{03}$ agrees with the length of one information symbol $S_{30}$ in the system 2.

More specifically, there are two types of method, a method of adding a symbol length adjustment signal to each information symbol shown in FIG. 14A and a method of adding a symbol length adjustment signal to each group of N information signals shown in FIG. 14B.

According to this embodiment, when a symbol length (or a symbol rate) of the own system (the system 1) is about N times longer (or faster) than a symbol length (or a symbol rate) of the different system (the system 2), as shown in FIG. 14A and FIG. 14B, it is possible to configure a communications system more effectively, by adjusting the adding method of the symbol length adjustment signal.

Seventh Embodiment

Figure 15:
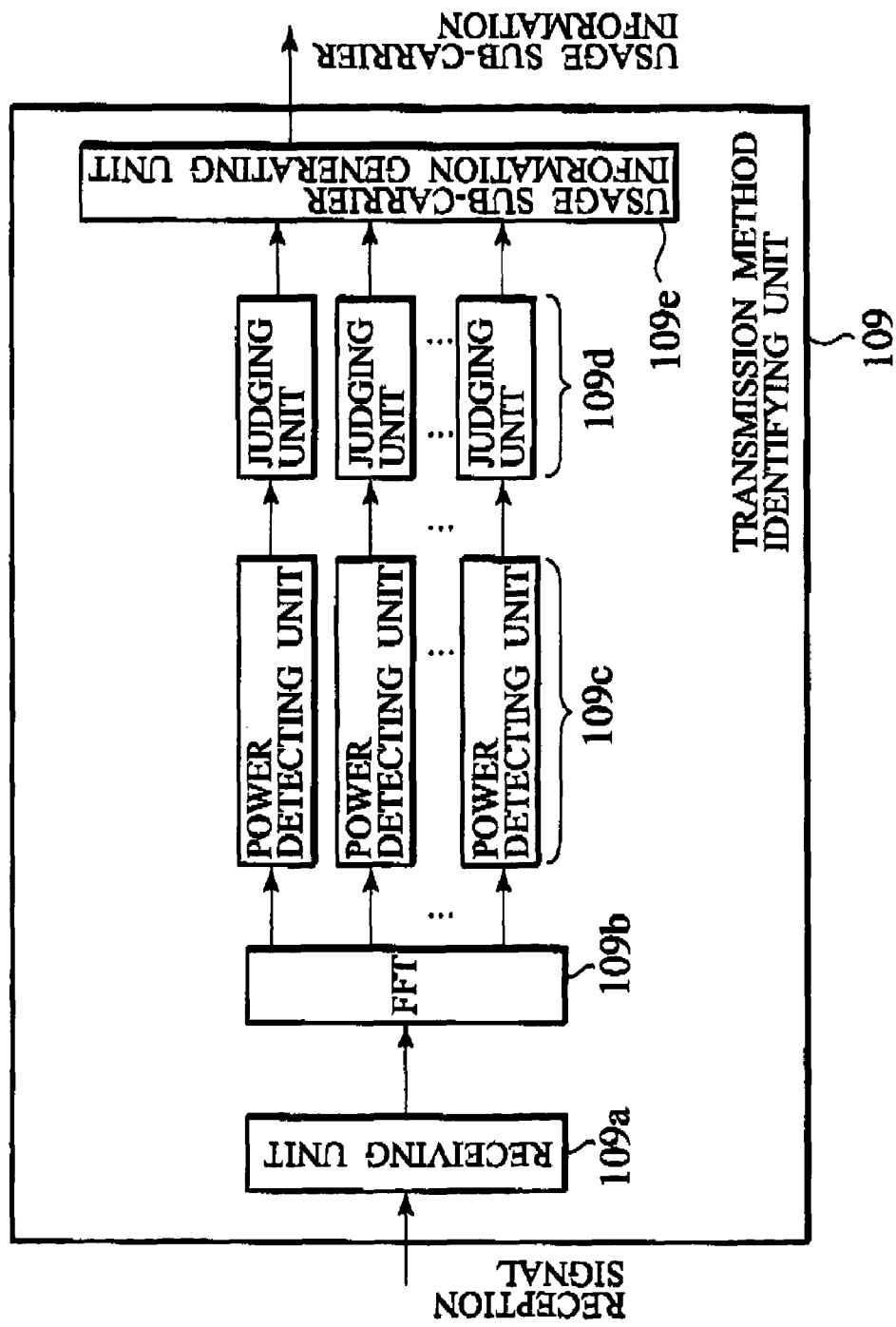
FIG. 15 is a functional block diagram of a transmission method identifying unit used in a seventh embodiment of the present invention.

With reference to FIG. 15, the seventh embodiment of the present invention will be described. Though the transmission method identifying unit 109 is configured to judge a sub-carrier used in the different system (the system 2) based on control information from the different system and so on in the above-described embodiments, a transmission method identifying unit 109 in this embodiment is configured to judge a sub-carrier used in a different system based on a reception signal from the different system, when a transmitting apparatus 100 exists independently, in other words, when the control information from the different system and so on cannot be received.

The transmission method identifying unit 109 of the transmitting apparatus 100 according to the seventh embodiment is configured to judge that a frequency bandwidth associated with a sub-carrier in the different system is used, when a power level of a signal component of the sub-carrier in a reception signal from the different system is larger than a predetermined threshold.

More specifically, as shown in FIG. 15, the transmission method identifying unit 109 includes a receiving unit 109a, a fast Fourier transforming unit (FFT) 109b, a plurality of power detecting units 109c, a plurality of judging units 109d and a usage sub-carrier information generating unit 109b.

The receiving unit 109a is configured to receive a signal from the different system (the system 2) via a reception antenna (not shown), and to perform a serial-parallel conversion process on the received signal for outputting to the fast Fourier transforming unit 109b.

The fast Fourier transforming unit 109b is configured to calculate signal components of each sub-carrier by performing a fast Fourier transforming process on an output from the receiving unit 109a, and to output the calculated signal components to each power detecting unit 109c associated with each sub-carrier. More specifically, the fast Fourier transforming unit 109b performs the fast Fourier transforming process, setting FFT windows, while establishing symbol synchronization.

The power detecting units 109c are each configured to detect power levels of signal components of each sub-carrier from the fast Fourier transforming unit 109b.

The judging units 109d are each configured to judge that a frequency bandwidth associated with a sub-carrier in the different system is used, when a power level of a signal component of the sub-carrier exceeds a predetermined threshold. For example, the judging units 109d output "1" to the usage sub-carrier information generating unit 109e as a judging result regarding a used sub-carrier, and output "0" to the usage sub-carrier information generating unit 109e as a judging result regarding an unused sub-carrier.

The usage sub-carrier information generating unit 109e is configured to gather the judging results in the judging units 109d for outputting as usage sub-carrier information.

In the seventh embodiment, the transmitting apparatus 100 may be configured to receive uplink radio signals and check a usage condition of an uplink radio channel, when the uplink radio channels and downlink radio channels are multiplexed with an FDD method. Also, the transmitting apparatus 100 may be configured to generate usage sub-carrier information in the downlink radio channels in the different system, in accordance with a rule of combining the uplink radio channels and the downlink radio channels in the different system.

Moreover, the configuration of the transmission method identifying unit 209 provided in the receiving apparatus 200 may be the configuration of the above-described transmission method identifying unit 109. In this case, the transmission method identifying unit 209 is configured to feed back the usage sub-carrier information to the transmitting apparatus 100.

Eighth Embodiment

Figure 16:
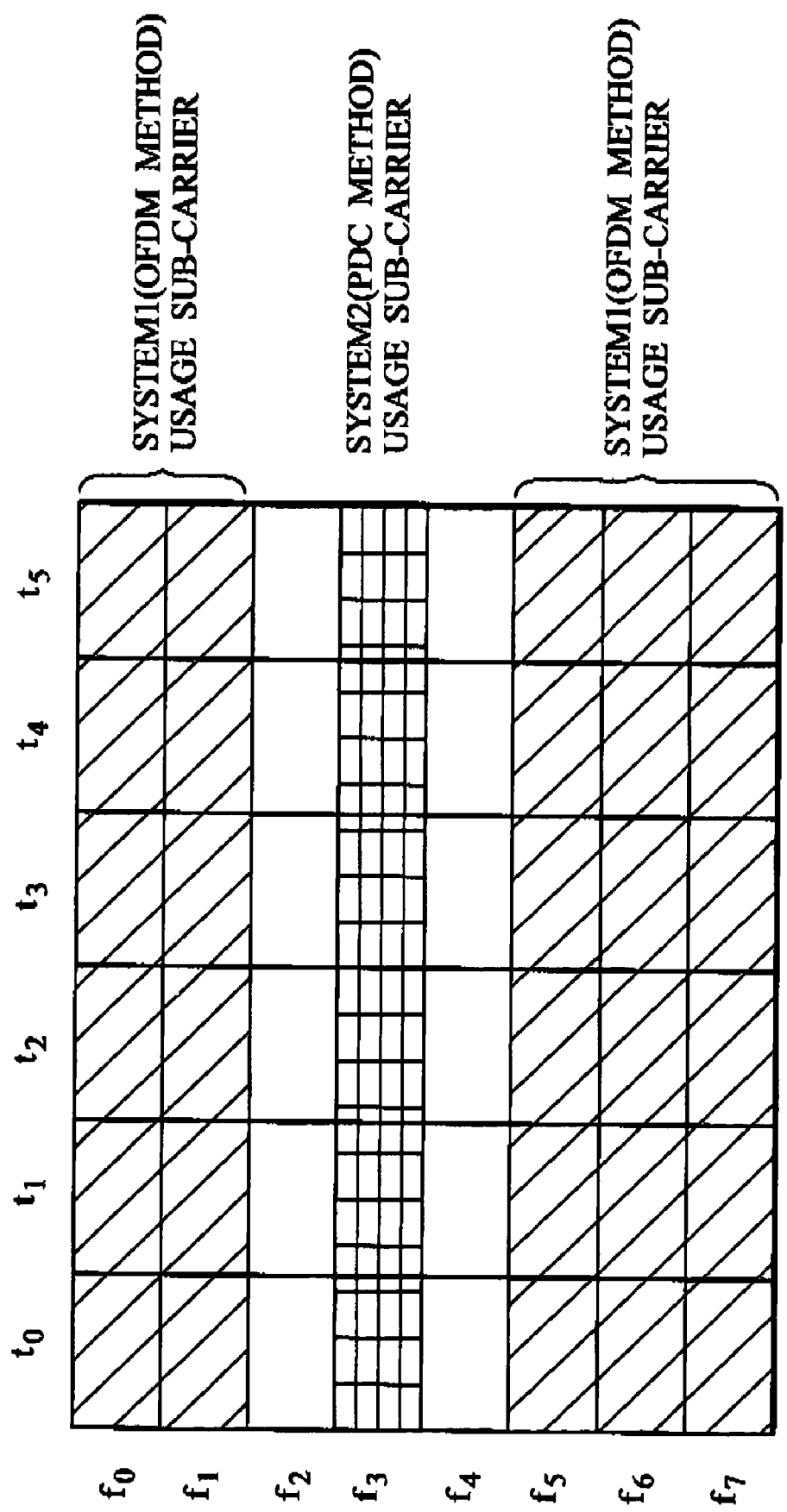
FIG. 16 is a diagram showing how to use sub-carriers in an eighth embodiment of the present invention.

With reference to FIG. 16, the eighth embodiment of the present invention will be described. The transmitting apparatus 100 according to the above-described embodiments is configured to transmit information symbols using a symbol length and a transmission timing used in a different system, and not to use a sub-carrier used in the different system for transmission of information symbols.

On the other hand, a transmitting apparatus 100 according to the eighth embodiment is characterized by adjusting so that a frequency bandwidth used in the different system and also a frequency bandwidth adjacent to the frequency bandwidth are not used for transmission of information symbols.

For example, as shown in FIG. 16, a sub-carrier mapping unit 131 and a pilot multiplexing unit 132 (see FIG. 6) in a base station 100a belonging to a system 1 of an OFDM method make not only a sub-carrier (a frequency bandwidth $f_3$) used in the system 2 of the PDC method but also sub-carriers of the frequency bandwidths $f_2$ and $f_4$ adjacent to the frequency bandwidth $f_3$ null sub-carriers.

Here, frequency bandwidths including a interference power level equal to or more than a predetermined threshold may be considered as frequency bandwidths adjacent to the frequency bandwidth of a sub-carrier used in the different system.

According to the eighth embodiment, the transmitting apparatus 100 need not synchronize with the different system, so as to transmit information symbols using a symbol length and a transmission timing used in the different system. Furthermore, the transmitting apparatus 100 can reduce an inter-system interference (including influence on the different system) greatly, even when using a symbol length different from a symbol length of the different system.

Ninth Embodiment

Figure 17:
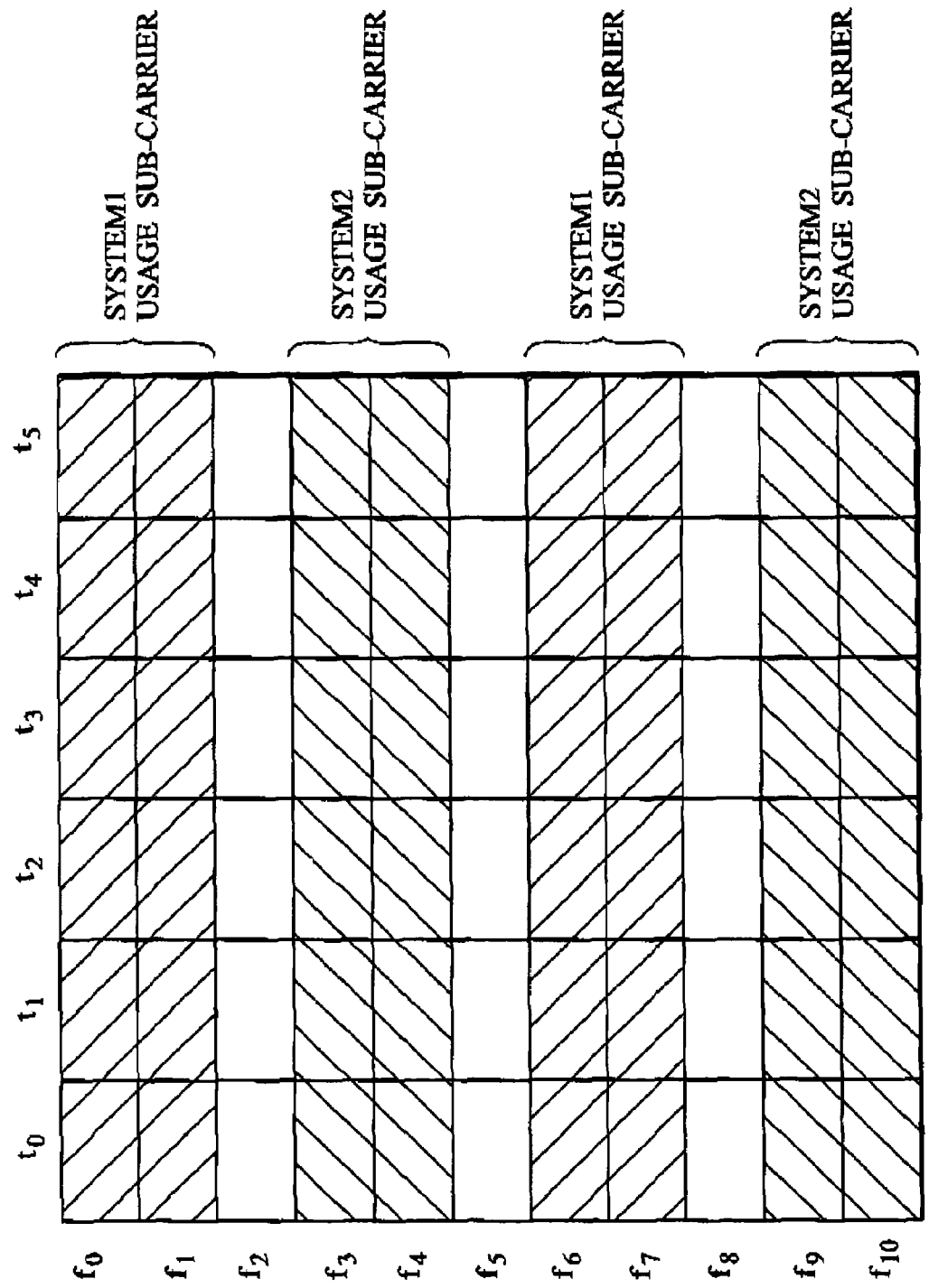
FIG. 17 is a diagram showing how to use sub-carriers in a ninth embodiment of the present invention.

Referring to FIG. 17, the ninth embodiment of the present invention will be described. A receiving apparatus 200 according to this embodiment is characterized by being able to recognize which frequency bandwidth is used in the own system, even when the frequency bandwidth to be used in the own system and a frequency bandwidth to be used in a different system are dynamically changed.

A transmission method identifying unit 209 of the receiving apparatus 200 according to this embodiment is configured to identify a frequency bandwidth used in one system (system 1) to which the receiving apparatus 200 belongs, based on information regarding a frequency bandwidth associated with a sub-carrier where a power level of a received signal component is equal to or smaller than a predetermined threshold and a frequency bandwidth used in a different system (system 2).

More specifically, the transmission method identifying unit 209 identifies the frequency bandwidth used in the system 1, based on null sub-carriers inserted by the transmitting apparatus 100 in the eighth embodiment.

The transmission method identifying unit 209 has a configuration as shown in FIG. 15, and can know positions of the null sub-carriers by detecting power levels of the signal components of each sub-carrier.

In FIG. 17, on the basis of the fact that frequency bandwidths divided by a null sub-carrier is used in different systems, it is possible to understand that the system 1 uses one of the frequency bandwidths $f_0$, $f_1$, $f_6$, $f_7$ and the frequency bandwidths $f_3$, $f_4$, $f_5$, $f_{10}$.

In this case, when the transmission method identifying unit 209 has information regarding a frequency bandwidth used in the system 2, for example, advance information showing that the system 2 does not use the frequency bandwidths $f_1$, $f_2$, it can judge that the system 1 uses the frequency bandwidths $f_0$, $f_1$, $f_6$, $f_7$.

The transmission method identifying unit 209 can specify a frequency bandwidth used in the system 1, using control information showing "1" if the system 1 occupies frequency bandwidths more than half of the total frequency bandwidths, and "0" if not.

For example, the transmission method identifying unit 209 may judge a sub-carrier where a power level of a signal component of the sub-carrier is equal to or less than 50% of a power level of a signal component of the sub-carrier predicted from a pilot symbol, to be a null sub-carrier.

Tenth Embodiment

Figure 18:
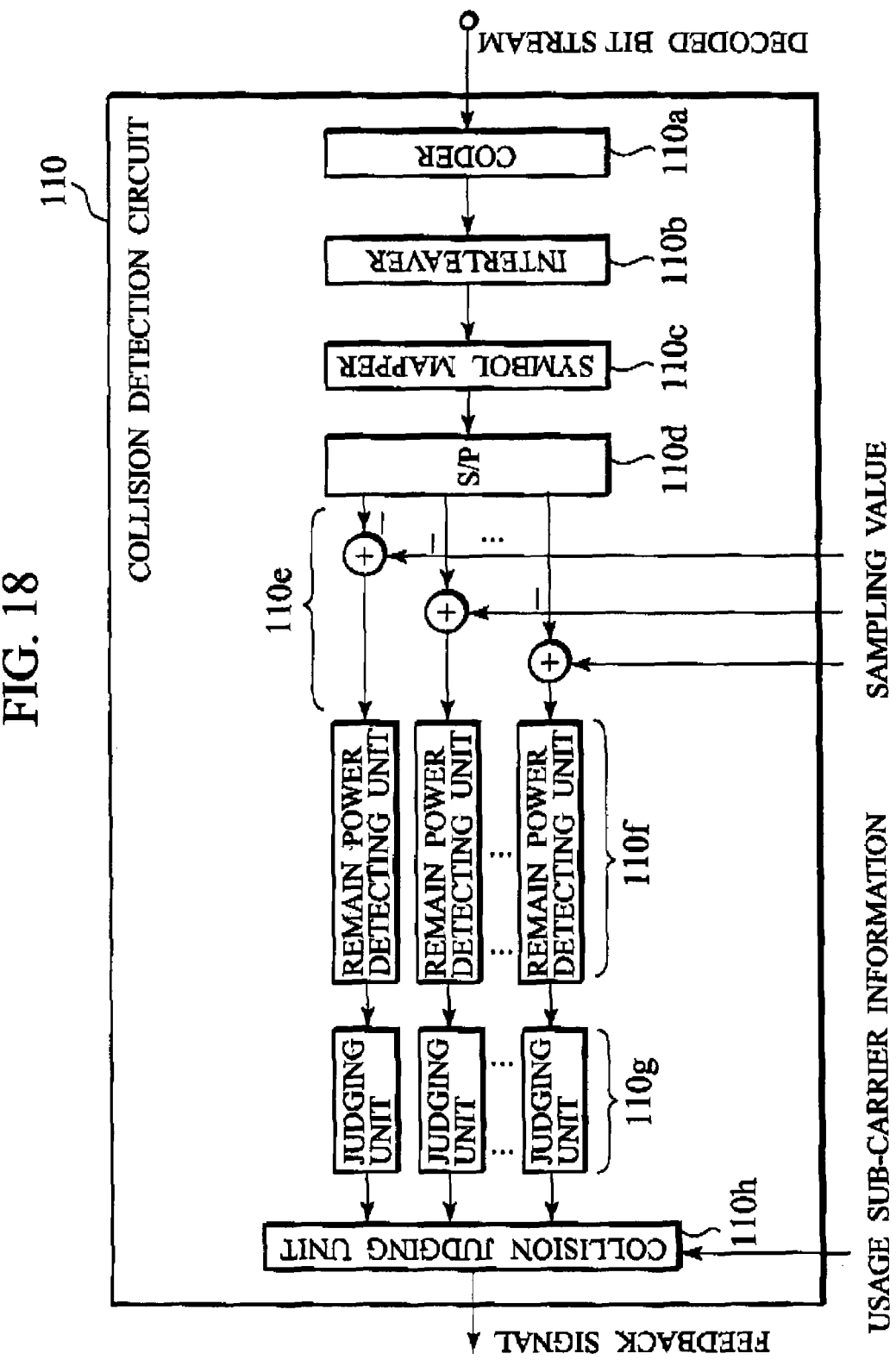
FIG. 18 is a functional block diagram of a collision detection circuit used in a tenth embodiment of the present invention.

Referring to FIG. 18, the tenth embodiment of the present invention will be described.

When a plurality of transmitting apparatuses belonging to coexisting systems transmit signals simultaneously, and a transmitting apparatus, detects an available carrier for determination of a frequency bandwidth to be used, etc., the "Hidden Terminal Problem" occurs. Therefore, there is a problem that a collision of reception signals can occur in a receiving apparatus unintentionally.

The tenth embodiment is configured to resolve the problem, detects a collision of reception signals in the receiving apparatus, and stops using a sub-carrier in which the collision has been detected immediately, so as to make a plurality of systems coexist in the same frequency bandwidth without interfering with other systems.

A receiving apparatus 200 according to the tenth embodiment includes a collision detection circuit 110 as shown in FIG. 18. As shown in FIG. 18, the collision detection circuit 110 includes a symbol mapper 110*a*, an interleaver 100*b*, a coder 110*c*, a serial-parallel converting unit 110*d*, a plurality of subtractors 110*e*, a plurality of remain power detecting units 110*f*, a plurality of judging units 110*g* and a collision judging unit 110*h*.

The symbol mapper 110*a*, the interleaver 110*b*, the coder 110*c* and the serial-parallel converting unit 110*d* are configured to generate a transmission symbol estimation value in the frequency domain, from decoded bit streams.

Each subtractor 110*e* is configured to subtract a sample value of a reception signal after a channel compensation, from each of the above-described transmission symbol estimation values, for output to each remain power detecting unit 110*f* corresponding to each sub-carrier.

Each remain power detecting unit 110*f* is configured to detect a power level of each sub-carrier.

The judging units 110*g* are each configured to detect a frequency bandwidth assoiciated with a sub-carrier where a power level detected by the remain power detecting unit 110*f* is equal to or more than a predetermined threshold (sub-carrier with remaining power), and judge that the frequency bandwidth is used in a different system.

In ideal environments, since signal components of a frequency bandwidth used in the own system are cancelled by the subtractors 110*e*, power of a signal component of a frequency bandwidth used in a different system is detected as remaining power.

Actually, however, noise power, channel estimation error and the like cause power of a frequency bandwidth used in the own system to be detected as remaining power. Therefore, the judging units 110*g* each judge a sub-carrier where a power level equal to or more than a predetermined threshold is detected to be a usage sub-carrier in a different system for output to the collision judging unit 110*h*.

Based on usage sub-carrier information from the transmission method identifying unit 209 and judgment results from the judging units 110*g*, the collision judging unit 110*h* compares a frequency bandwidth currently used in the own system with a frequency bandwidth used in a different system. When the same frequency bandwidth is used in both the systems, it judges that a signal collision has occurred. The collision judging unit 110*h* communicates the occurrence of the signal collision as a feedback signal to the transmitting apparatus 100.

The collision circuit 110 may be configured to further include an error detecting unit to perform the above-described process after confirming that no error exists in a bit stream.

The remain power detecting units 110*f* may be configured to output average remaining power of a plurality of OFDM symbols (e.g., of one frame).

Eleventh Embodiment

With reference to FIG. 19, the eleventh embodiment of the present invention will be described. A receiving apparatus 200 in this embodiment, is provided with an available carrier detection circuit 111 in place of the collision detection circuit 110 in the receiving apparatus 200 in the above-described tenth embodiment.

As shown in FIG. 19, the available carrier detection circuit 111 includes a plurality of power detecting units 111*a*, a plurality of judging units 111*b*, and a new available carrier detecting unit 111.

The power detecting units 111*a* are configured to detect a power level of each reception signal component after fast Fourier transform (or after channel compensation). The power detecting units 111*a* are configured such that only those corresponding to currently unused sub-carriers operate, based on usage sub-carrier information.

The judging units 111b are configured to detect a frequency bandwidth associated with a sub-carrier where a power level of a reception signal component is equal to or lower than (or below) a predetermined threshold. The judging units 111b are configured such that only those corresponding to currently unused sub-carriers operate, based on usage sub-carrier information. Alternatively, the judging units 111b may be configured such that those corresponding to sub-carriers of frequency bandwidths used in a different system do not operate.

For example, the, judging units 111b are each configured to output "0" when an associated sub-carrier is currently used or an associated sub-carrier is not used and the power level is equal to or greater than the threshold, and to output "1" when an associated sub-carrier is not currently used and the power level is below the threshold.

The new available carrier detecting unit 111c is configured to detect a frequency bandwidth unused in a system (system 1) to which the receiving apparatus 200 belongs and in a different system (system 2), based on a frequency bandwidth used in the different system identified by a transmission method identifying unit 209 and a frequency bandwidth detected by the judging units 111b.

More specifically, the new available carrier detecting unit 111c detects a sub-carrier of a frequency bandwidth unused in both the system 1 and the system 2, based on judgment results from the determining units 111b. Then, the new available carrier detecting unit 111c refers to usage sub-carrier information from the transmission method identifying unit 209, and detects a new sub-carrier of a frequency bandwidth which stops being used in both the systems to communicate it as a feedback signal to the transmitting apparatus 100.

Such a situation occurs when a communication having been performed in a different system is ended. This embodiment allows more effective utilization of frequency bandwidths.

Twelfth Embodiment

Figure 20A:
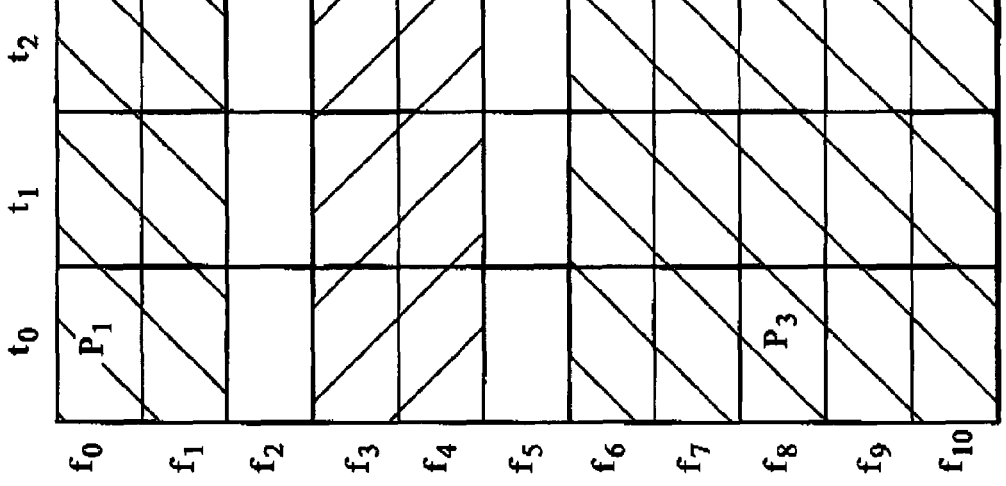
FIGS. 20A and 20B are diagrams for explaining inconvenience in the conventional OFDM method.
Figure 20B:
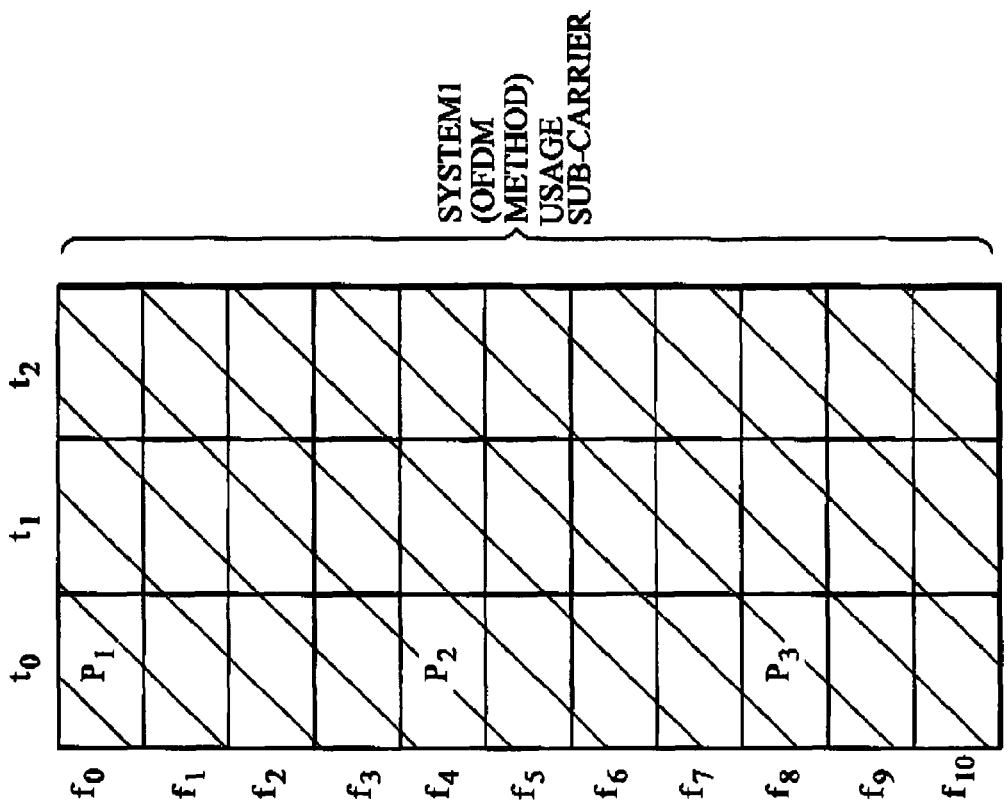
Figure 21:
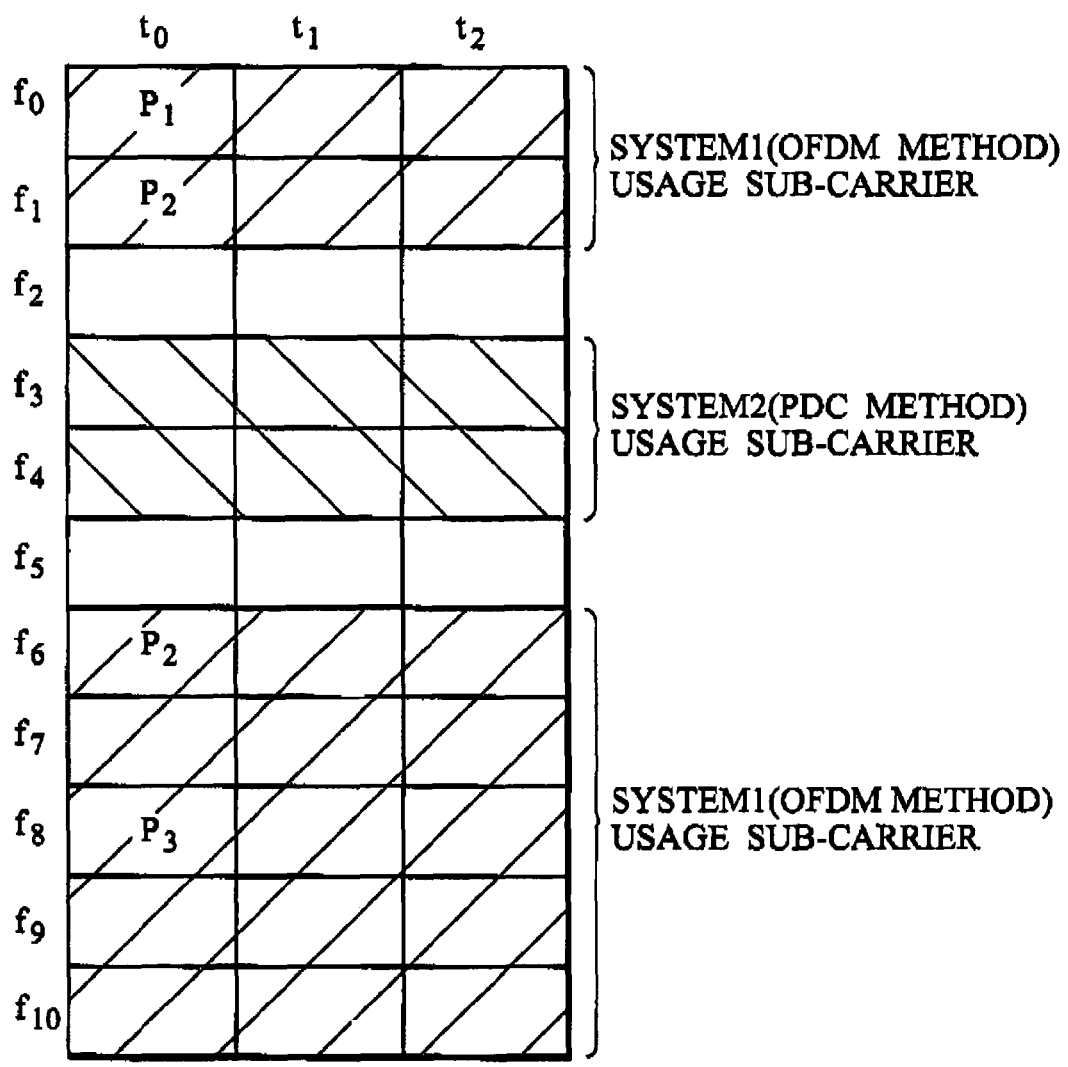
FIG. 21 is a diagram showing how to use sub-carriers in a twelfth embodiment of the present invention.

With reference to FIGS. 20A to 21, the twelfth embodiment of the present invention will be described. A pilot multiplexing unit 132 (see FIG. 6) in a transmitting apparatus 100 of this embodiment is configured to multiplex a scattered pilot symbol.

FIG. 20A illustrates the arrangement of pilot symbols when a system 1 of an OFDM method exclusively uses all the frequency band widths $f_0$ to $f_{10}$. In the example of FIG. 20A, pilot symbols $P_1$, $P_2$ and $P_3$ are multiplexed in a time slot $t_0$ of the frequency bandwidth $f_0$, a time slot $t_0$ of the frequency bandwidth $f_4$, and a time slot $t_0$ of the frequency bandwidth $f_8$, respectively. Since scattered pilot symbols are herein used, a channel estimate in a time slot in which a pilot symbol is not multiplexed can be obtained by complementing a channel estimate in a time slot in which a pilot symbol is multiplexed.

On the other hand, FIG. 20B illustrates the arrangement of pilot symbols when a system 2 of a PDC method uses the frequency bandwidths $f_3$ and $f_4$. In the example of FIG. 20B, pilot symbols $P_1$ and $P_3$ are multiplexed in a time slot $t_0$ of the frequency bandwidth $f_0$ and a time slot $t_0$ in the frequency bandwidth f8, respectively. Since the frequency bandwidth $f_4$ is used by the system 2, the pilot symbol $P_2$ is not multiplexed, In this case, there is a problem that the precision of estimation of channel estimates in sub-carriers of the frequency bandwidths $f_1$, $f_6$ and $f_7$ on which channel estimates should have been obtained using the pilot symbol P2 is greatly lowered.

The transmitting apparatus 100 in this embodiment is configured to solve this problem. As shown in FIG. 21, the pilot multiplexing unit 132 is configured to multiplex pilot symbols in sub-carries associated with the frequency bandwidths $f_1$ and $f_6$ adjacent to the frequency bandwidths $f_2$ and $f_5$ which are not used for transmission of information symbols.

That is, the transmitting apparatus 100 is configured to use a predetermined algorithm which is also used by the receiving apparatus 200 according to a sub-carrier associated with a frequency bandwidth for use in transmission of information symbols, to determine the arrangement of pilot symbols to be multiplexed.

The transmitting apparatus 100 may alternatively be configured to communicate the arrangement of pilot symbols to the receiving apparatus 200 by control information or the like.

Alternatively, by previously determining an algorithm of arranging pilot symbols according to a pattern of frequency bandwidth occupation by a different system, this embodiment can be implemented without communicating the above-described control information.

As shown in FIG. 21, for example, the transmitting apparatus 100 and the receiving apparatus 200 can share a rule that, in time slots t0 in which pilot symbols are arranged, pilot symbols be arranged in the frequency bandwidths $f_1$ and $f_6$ adjacent to the frequency bandwidths $f_2$ and $f_5$ which are judged to be non-usage frequency bandwidths due to the influence of occupation by the system 2, thereby to implement this embodiment.

This embodiment enables dynamic sharing of frequency bandwidths by a plurality of systems without reducing channel estimate precision.

Also, according to this embodiment, a transmitting apparatus and a receiving apparatus can share a pilot symbol arrangement algorithm according to a sub-carrier used in the own system to rearrange pilot symbols in the transmitting apparatus and the receiving apparatus without using a control signal.

Thirteenth Embodiment

Figure 22:
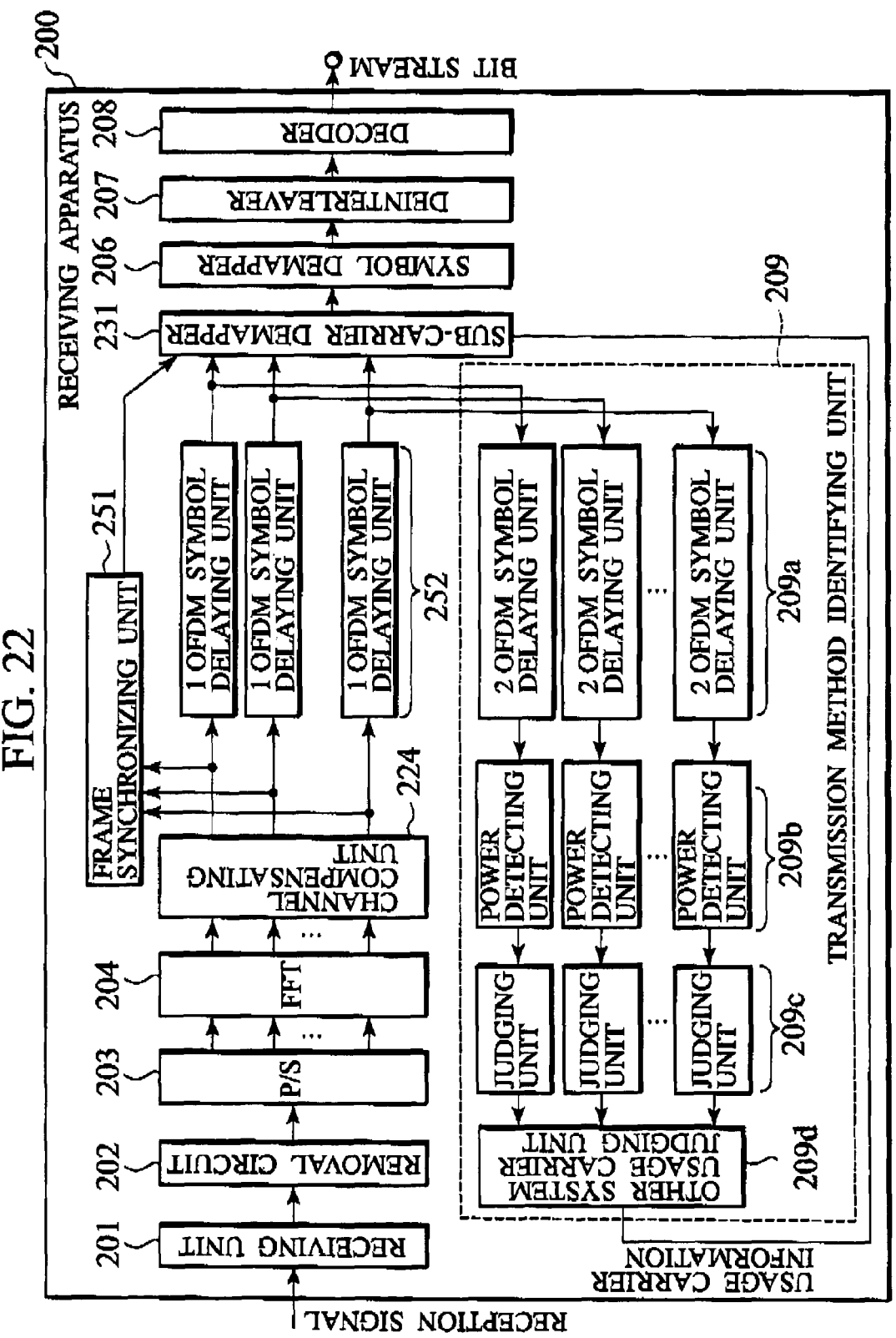
FIG. 22 is a functional block diagram of a receiving apparatus according to a thirteenth embodiment of the present invention.
Figure 23:
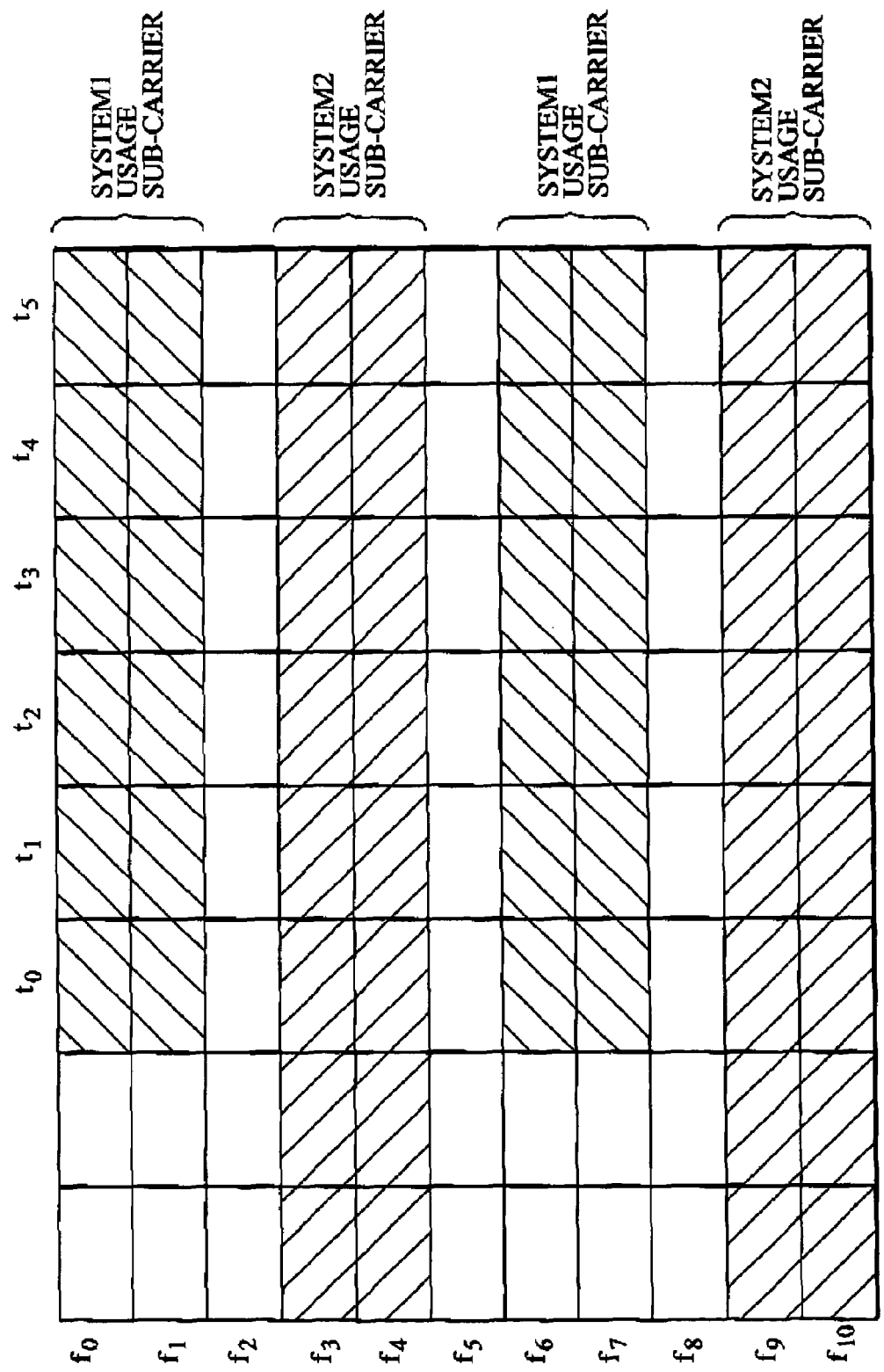
FIG. 23 is a diagram showing how to use sub-carriers in the thirteenth embodiment of the present invention.

With reference to FIGS. 22 and 23, the thirteenth embodiment of the present invention will be described.

This embodiment is for a case where a system 1 starts communication using a frequency bandwidth unused in a system 2 while the system 2 performs communication.

A receiving apparatus 200 in this embodiment can judge which frequency bandwidth is used in the own system even when frequency bandwidths occupied by the own system and a different system change dynamically and no null sub-carriers are inserted by a transmitting apparatus 100.

As shown in FIG. 22, the receiving apparatus 200 in this embodiment includes a frame synchronizing unit 251 and a plurality of 1 OFDM symbol delaying unit 252 in addition to the components in the receiving apparatus 200 shown in FIG. 8.

A transmission method identifying unit 209 includes a plurality of 2 OFDM symbol delaying units 209a, a plurality of power detecting units 209b, a plurality of judging units 209c, and a usage carrier judging unit 209d.

The frame synchronizing unit 251 uses a correlation between an output from a channel compensating unit 224 and a pilot symbol to detect the head of a frame used in an OFDM method.

The frame synchronizing unit 251 uses a pilot symbol arranged in an OFDM symbol in the head of a frame to establish frame synchronization. The OFDM symbol in the head of the frame includes a data symbol together with the pilot symbol.

Therefore, a sub-carrier demapping unit 231 needs to start a reception process on data symbols from an OFDM symbol at the time of establishment of frame synchronization. For this, the 1 OFDM symbol delaying units 252 corresponding to respective sub-carriers are provided between the sub-carrier demapping unit 231 and the channel compensating unit 224.

The transmission method identifying unit 209 is configured to identify a frequency bandwidth used in a system (system 1) to which the receiving apparatus 200 belongs, based on reception power of each sub-carrier in an interval before the head of an OFDM frame used in the system 1.

As shown in FIG. 23, in OFDM symbols in first and second time slots before the head of a OFDM frame used in the system 1, reception power of sub-carriers of frequency bandwidths used in a system 2 is only detected.

Therefore, each power detecting unit 209b detects reception power of the corresponding sub-carrier from an output from the 2 OFDM symbol delaying unit 209a, that is, from an OFDM symbol in a time slot before the head of an OFDM frame used in the system 1.

The judging units 209c detect reception power of sub-carriers of frequency bandwidths used in the system 2, based on outputs from the power detecting units 209b. At that time, in consideration of the influence of noise power and the like, the judging units 209c can judge a sub-carrier having a power level equal to or more than a predetermined threshold to be a sub-carrier of a frequency bandwidth used in a different system (system 2).

The usage carrier judging unit 209d judges a sub-carrier other than sub-carriers of frequency bandwidths used in the different system (system 2) to be a sub-carrier used in the own system, and communicates the judgment result as usage sub-carrier information to a sub-carrier demapper 231,

[Modification]

The present invention is not limited to the above-described embodiments, and may be modified as will be described below, for example.

(Modification 1)

A communication system according to modification 1 is configured such that the transmission method identifying unit 109 provided in the base station 100 in the above-described embodiments is provided in a control device 400.

Figure 24:
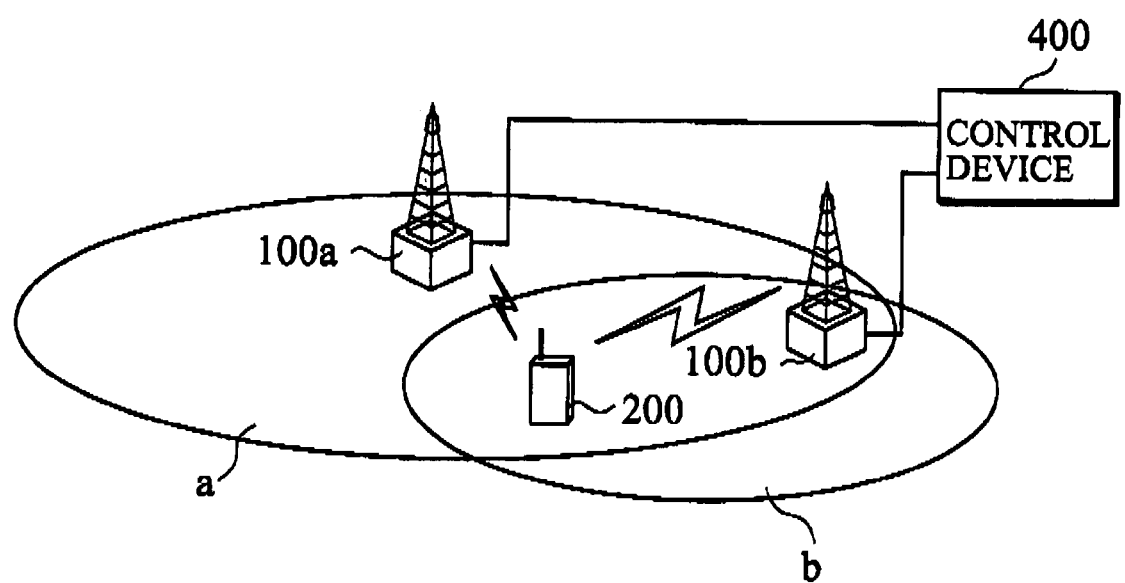
FIG. 24 is a diagram showing an entire configuration of a communications system according to a modification of the present invention.

In this case, as shown in FIG. 24, the control device 400 is configured to communicate information on a transmission method such as usage sub-carrier information, symbol length information, and transmission timing information to a base station 100a. The base station 100a transmits information symbols based on information on the transmission method communicated from the control device 400.

(Modification 2)

The above-described embodiments have been described with an example in which the base station 100a and the base station 100b transmit information symbols using different transmission methods. The present invention can also be applied to the case where the same base station 100a transmits information symbols using different transmission methods.

In this case, the base station 100a is configured to add symbol length adjustment signals to signals to be transmitted by different transmission methods via the same transmission antenna for transmission.

(Modification 3)

The communication systems in the above-described embodiments and the modifications can be implemented by control programs written in predetermined computer language.

Specifically, the control programs can be installed in a computers provided at the base station 100a, the control device 400, a relay device (not shown) and the like to easily build the communication systems in the above-described embodiments and their modifications.

Figure 25:
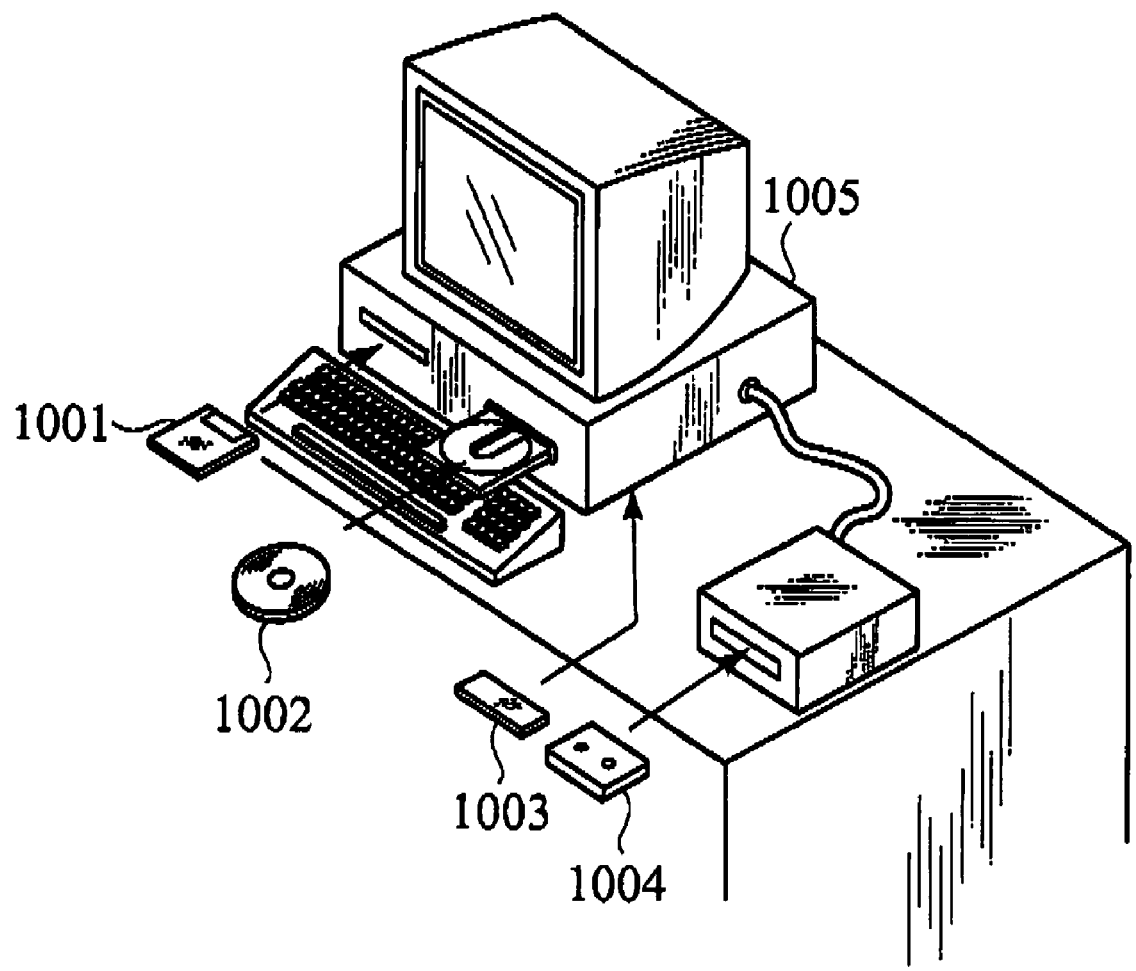
FIG. 25 is a diagram showing a recording medium on which a control program for controlling the communications system according to the modification of the present invention is recorded.

The control programs can be recorded on record media 1001 to 1004 readable by a general-purpose computer 1005 as shown in FIG. 25.

Specifically, as shown in FIG. 25, the control programs can be recorded on various record media including magnetic recording media such as a flexible disk 1001 and a cassette tape 1004, optical disks such as a CD-ROM and a DVD-ROM 1002, and a RAM card 1003.

Such computer-readable record media recorded on which the control programs are recorded allow the communications systems and communications methods according to the above-described embodiments and modifications to be implemented using a general-purpose computer and a dedicated-purpose computer, and also facilitate the storage, transport and installation of the control programs.

INDUSTRIAL APPLICABILITY

As described above, the present invention allows a system of a wideband OFDM method and a system of a narrowband transmission scheme to be mixed in the same frequency bandwidth, and thus allows use of two transmission methods in the same frequency bandwidth. As a result, a new-generation and a current-generation communications methods can be mixed, and thus a communications method can be changed from a current method to a new method in stages smoothly.

The invention claimed is:

1. A communications system comprising:
  a first transmitting apparatus configured to communicate with a receiving apparatus in a first system using a first communication method; and
  a second transmitting apparatus configured to perform communication in a second system using a second communication method, said second system having a cell coverage area overlapping a cell coverage area of the first system,
  wherein the first transmitting apparatus and the second transmitting apparatus share a frequency bandwidth, transmit respective information symbols by using the shared frequency bandwidth, and are initially configured to transmit the respective information symbols using different information symbol lengths with respect to the symbol length used by the other transmitting apparatus, and wherein
  the first transmitting apparatus comprises:
  an identifying unit configured to receive control information from the second system and identify a symbol length of a second information symbol transmitted from the second transmitting apparatus based on the received control information; and
  an adjusting unit configured to adjust a symbol length of a first information symbol transmitted from the first transmitting apparatus, by adding, to the first information symbol, a symbol length adjustment signal corresponding to the difference between the identified symbol length of the second information symbol and the symbol length of the first information symbol transmitted from the first transmitting apparatus.

2. A communications method in which a first transmitting apparatus and a second transmitting apparatus share a frequency bandwidth, transmit respective information symbols by using the shared frequency bandwidth, and are initially configured to transmit the respective information symbols using different information symbol lengths with respect to the symbol length used by the other transmitting apparatus, the first transmitting apparatus being configured to communicate with a receiving apparatus in a first system using a first communication method and the second transmitting apparatus being configured to perform communication in a second system using a second communication method, the second system having a cell coverage area overlapping a cell coverage area of the first system, the method comprising:

receiving, in the first transmitting apparatus, control information from the second system;

identifying, in the first transmitting apparatus, a symbol length of a second information symbol transmitted from the second transmitting apparatus based on the received control information; and adjusting, in the first transmitting apparatus, a symbol length of a first information symbol transmitted from the first transmitting apparatus, by adding, to the first information symbol, a symbol length adjustment signal corresponding to the difference between the identified symbol length of the second information symbol and the symbol length of the first information symbol transmitted from the first transmitting apparatus.

3. A transmitting apparatus in a communications system in which the transmitting apparatus and a second transmitting apparatus share a frequency bandwidth, transmit respective information symbols by using the shared frequency bandwidth, and are initially configured to transmit the respective information symbols using different information symbol lengths with respect to the symbol length used by the other transmitting apparatus, the transmitting apparatus being configured to communicate with a receiving apparatus in a first system using a first communication method and the second transmitting apparatus being configured to perform communication in a second system using a second communication method, the second system having a cell coverage area overlapping a cell coverage area of the first system, the transmitting apparatus comprising:

an identifying unit configured to receive control information from the second system and identify a symbol length of a second information symbol transmitted from the second transmitting apparatus based on the received control information; and an adjusting unit configured to adjust a symbol length of an information symbol to be transmitted from the transmitting apparatus, by adding, to the information symbol, a symbol length adjustment signal corresponding to the difference between the identified symbol length of the second information symbol received from the second transmitting apparatus and symbol length of the information symbol transmitted from the transmitting apparatus.

4. The transmitting apparatus as set forth in claim 3, wherein the identifying unit is configured to identify a transmission timing of the second information symbol from the second transmitting apparatus; and the adjusting unit is configured to adjust a transmission timing of the first information symbol to be transmitted from the transmitting apparatus, in accordance with the identified transmission timing of the second information symbol.

5. The transmitting apparatus as set forth in claim 3, wherein the transmitting apparatus is configured to transmit a first information symbol using an OFDM (orthogonal frequency division multiplexing) method;

the transmitting apparatus comprises a spreading unit configured to spread the first information symbol to be transmitted from the transmitting apparatus, with a spreading code assigned to a receiving apparatus; and the adjusting unit is configured to adjust the symbol length of a spread first information symbol, in accordance with the identified symbol length of the second information symbol.

6. The transmitting apparatus as set forth in claim 3, wherein the adjusting unit is configured to adjust the symbol length of a first information symbol to be transmitted from the transmitting apparatus, by adding a symbol length adjustment signal to the first information symbol so that an effective symbol interval of the first information symbol is set in the middle of a symbol interval of the first information symbol.

7. The transmitting apparatus as set forth in claim 6, wherein the transmitting apparatus is configured to transmit the first information symbol with using an OFDM method; and a part of the symbol length adjustment signal or the whole of the symbol length adjustment signal constitutes a guard interval.

8. The transmitting apparatus as set forth in claim 3, wherein the adjusting unit is configured to adjust the symbol length of a first information symbol to be transmitted from the transmitting apparatus, so that the symbol length of the first information symbol becomes a nonnegative integral multiple or a nonnegative integral submultiple of the identified symbol length of the second information symbol.

9. The transmitting apparatus as set forth in claim 3, wherein the transmitting apparatus is configured to transmit a first information symbol using an OFDM method;

the identifying unit is configured to identify a frequency bandwidth used by the second transmitting apparatus; and the adjusting unit is configured to adjust so as not to use the identified frequency bandwidth and a frequency bandwidth adjacent to the identified frequency bandwidth for transmission of the first information symbol.

10. The transmitting apparatus as set forth in claim 9, comprising:

a pilot multiplexing unit configured to determine allocation of a pilot symbol to be multiplexed, by using a predetermined algorithm which is shared with a receiving apparatus, in accordance with a sub-carrier which is associated with a frequency bandwidth to be used for the transmission of the first information symbol.

11. The transmitting apparatus as set forth in claim 10, wherein the pilot multiplexing unit is configured to multiplex the pilot symbol to a sub-carrier which is associated with a frequency bandwidth adjacent to a frequency bandwidth not to be used for the transmission of the first information symbol.

12. The transmitting apparatus as set forth in claim 3, wherein the transmitting apparatus is configured to transmit a first information symbol using an OFDM method; and the identifying unit is configured to judge that a frequency bandwidth associated with a sub-carrier in a reception signal from the second transmitting apparatus is used by the second transmitting apparatus, when a power level of a signal component of the sub-carrier is larger than a predetermined threshold.

13. A receiving apparatus in a communications system which includes a first transmitting apparatus and a second transmitting apparatus, said first transmitting apparatus and second transmitting apparatus share a frequency bandwidth, transmit respective information symbols by using the shared frequency bandwidth, and are initially configured to transmit the respective information symbols using different information symbol lengths with respect to the symbol length used by the other transmitting apparatus, the first transmitting apparatus being configured to communicate with the receiving apparatus in the first system using a first communication method and the second transmitting apparatus being configured to perform communication in a second system using a second communication method, the second system having a cell coverage area overlapping a cell coverage area of the first system, the receiving apparatus comprising:
  an identifying unit configured to receive a reception signal from the second system and identify a symbol length of a second information symbol which is transmitted from the second transmitting apparatus based on the received reception signal; and
  an adjusting unit configured to specify a symbol length adjustment signal included in a received first information symbol received from the first transmitting apparatus and to remove the symbol length adjustment signal from the received first information symbol, in accordance with the identified symbol length of the second information symbol.

14. The receiving apparatus as set forth in claim 13, wherein
  the receiving apparatus is configured to receive the first information symbol transmitted using an OFDM method; and
  the identifying unit is configured to identify a frequency bandwidth used by the first transmitting apparatus, based on information on a frequency bandwidth associated with a sub-carrier in which a power level of a received signal component is smaller than or equal to a predetermined threshold and information on a frequency bandwidth used by the second transmitting apparatus.

15. The receiving apparatus as set forth in claim 13, wherein
  the receiving apparatus is configured to receive the first information symbol transmitted using an OFDM method; and
  the receiving apparatus comprises:
  a power detecting unit configured to detect a frequency bandwidth associated with a sub-carrier in which a power level of a received signal component is larger than or equal to a predetermined threshold; and
  a collision detecting unit configured to detect a collision of signals in the same frequency bandwidth, based on a frequency bandwidth used by the second transmitting apparatus which is identified by the identifying unit and the frequency bandwidth detected by the power detecting unit.

16. The receiving apparatus as set forth in claim 13, wherein
  the receiving apparatus is configured to receive the first information symbol transmitted using an OFDM method; and
  the receiving apparatus comprises:
  a power detecting unit configured to detect a frequency bandwidth associated with a sub-carrier in which a power level of a received signal component is smaller than or equal to a predetermined threshold; and
  a non-usage frequency bandwidth detecting unit configured to detect a frequency bandwidth which is not used by the first transmitting apparatus and the second transmitting apparatus, based on a frequency bandwidth used by the second transmitting apparatus which is identified by the identifying unit and the frequency bandwidth detected by the power detecting unit.

17. The receiving apparatus as set forth in claim 13, wherein
  the receiving apparatus is configured to receive the first information symbol transmitted using an OFDM method; and
  the identifying unit is configured to identify a frequency bandwidth used by the first transmitting apparatus to which the receiving apparatus belongs, based on a reception power of a sub-carrier in an interval preceding a head of an OFDM frame.

18. A computer readable recording medium having instruction code recorded thereon, the instruction code, when executed on a computer, is configured to provide a control program which controls a transmitting apparatus in a communications system in which the transmitting apparatus and a second transmitting apparatus share a frequency bandwidth, transmit respective information symbols by using the shared frequency bandwidth, and are initially configured to transmit the respective information symbols using different information symbol lengths with respect to the symbol length used by the other transmitting apparatus, the transmitting apparatus being configured to communicate with a receiving apparatus in a first system using a first communication method and the second transmitting apparatus being configured to perform communication in a second system using a second communication method, the second system having a cell coverage area overlapping a cell coverage area of the first system, wherein
  the control program makes the computer function as:
  an identifying unit configured to receive control information from the second system and identify a symbol length of a second information symbol which is the information symbol transmitted by the second transmitting apparatus based on the received control information; and
  a notifying unit configured to notify the transmitting apparatus of a symbol length adjustment signal to be added to a first information symbol transmitted by the transmitting apparatus, so as to adjust a symbol length of the first information symbol, by adding, to the first information symbol, a symbol length adjustment signal corresponding to the difference between the identified symbol length of the second information symbol and the symbol length of the first information symbol transmitted from the transmitting apparatus.

* * * * *